US012792703B2

(12) United States Patent
Chen

(10) Patent No.: US 12,792,703 B2
(45) Date of Patent: Nov. 10, 2026

(54) ACCESS CONTROL METHOD AND RELATED APPARATUS

(71) Applicant: Huawei Technologies Co., Ltd., Shenzhen (CN)

(72) Inventor: Xiaodong Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 206 days.

(21) Appl. No.: 18/541,667

(22) Filed: Dec. 15, 2023

(65) Prior Publication Data

US 2024/0134947 A1 Apr. 25, 2024
US 2024/0232304 A9 Jul. 11, 2024

Related U.S. Application Data

(63) Continuation of application No. PCT/CN2022/096892, filed on Jun. 2, 2022.

(30) Foreign Application Priority Data

Jun. 18, 2021 (CN) ........................ 202110681518.6

(51) Int. Cl.
*G06F 21/31* (2013.01)

(52) U.S. Cl.
CPC .................................... *G06F 21/31* (2013.01)

(58) Field of Classification Search
CPC .. G06F 21/31; G06F 2221/2149; G06F 21/32; H04M 1/724631; H04M 2250/74; H04M 1/67; H04M 1/72433; H04M 1/72463; G10L 15/22; G10L 17/02; G10L 17/22; G10L 2015/223
USPC ........................................................... 726/19
See application file for complete search history.

(56) References Cited

U.S. PATENT DOCUMENTS

| | | | |
|---|---|---|---|
| 11,954,238 B1 * | 4/2024 | Tan | H04L 9/0891 |
| 2010/0024016 A1 | 1/2010 | Violleau et al. | |
| 2010/0024028 A1 | 1/2010 | Baugher et al. | |
| 2012/0154413 A1 | 6/2012 | Kim et al. | |

(Continued)

FOREIGN PATENT DOCUMENTS

| | | |
|---|---|---|
| CN | 103324893 A | 9/2013 |
| CN | 108038361 A | 5/2018 |

(Continued)

*Primary Examiner* — Jacob Lipman
(74) *Attorney, Agent, or Firm* — Slater Matsil, LLP

(57) ABSTRACT

In accordance with an embodiment, an access control method includes: receiving, by an electronic device, a first instruction, wherein the first instruction is used to open a target application; failing, by the electronic device, to authenticate the first instruction, or skipping, by the electronic device, authenticating the first instruction; running, by the electronic device, the target application in response to the first instruction, wherein the electronic device cannot access first data through the target application, and the first data is data accessible to the target application after the electronic device successfully authenticates the first instruction; receiving, by the electronic device, authentication information; and accessing, by the electronic device, the first data through the target application in response to the authentication information being successfully authenticated.

19 Claims, 16 Drawing Sheets

(56) References Cited

U.S. PATENT DOCUMENTS

| | | | | |
|---|---|---|---|---|
| 2014/0068755 | A1* | 3/2014 | King | G06F 3/04883 726/19 |
| 2014/0085460 | A1* | 3/2014 | Park | H04M 1/673 348/135 |
| 2018/0247065 | A1 | 8/2018 | Rhee et al. | |
| 2022/0269762 | A1 | 8/2022 | Zhao et al. | |

FOREIGN PATENT DOCUMENTS

| | | | | |
|---|---|---|---|---|
| CN | 110111794 | A | 8/2019 | |
| CN | 112398978 | A | 2/2021 | |
| CN | 116974450 | A * | 10/2023 | G06F 3/0488 |
| WO | 2020097830 | A1 | 5/2020 | |

* cited by examiner

ACCESS CONTROL METHOD AND RELATED APPARATUS

CROSS-REFERENCE TO RELATED APPLICATIONS

This application is a continuation of International Application No. PCT/CN2022/096892, filed on Jun. 2, 2022, which claims priority to Chinese Patent Application No. 202110681518.6, filed on Jun. 18, 2021. The disclosures of the aforementioned applications are hereby incorporated by reference in their entireties.

TECHNICAL FIELD

This application relates to the field of electronic technologies, and in particular, to an access control method and a related apparatus.

BACKGROUND

A voice assistant application is an application that performs voice recognition and semantic understanding on a received voice signal and that performs a corresponding operation based on recognized semantic information. Scenarios such as driving, cooking, and exercising are rigid requirement scenarios of a voice assistant. In these scenarios, a mobile phone is generally not at hand or it is inconvenient for a user to trigger an operation on the mobile phone by hand. In this case, the user may input a voice signal, and control the mobile phone by using the voice assistant application, for example, open a map or play music.

When an electronic device is in a screen lock state, in most scenarios, the user needs to unlock the electronic device first before controlling the mobile phone via voice. For example, the user inputs a voice instruction to instruct the electronic device to open a music player application, and the electronic device outputs a voice prompt indicating that the electronic device needs to be unlocked first. Currently, common unlock methods are face unlock, password unlock, and fingerprint unlock. All these unlock methods require the user to operate the electronic device in a touch manner. However, when the user needs to control the mobile phone via voice, it is usually inconvenient for the user to operate the electronic device in the touch manner, for example, in a scenario such as driving, cooking, or exercising. This loses voice convenience.

Therefore, how to implement portable access to an application program while ensuring security is a problem that is being studied by a person skilled in the art.

SUMMARY

Embodiments of this application provide an access control method and a related apparatus to improve convenience and security of accessing an application program.

According to a first aspect, this application provides an access control method. The method includes: An electronic device receives a first instruction, where the first instruction is used to open a target application; the electronic device fails to authenticate the first instruction, or the electronic device skips authenticating the first instruction; the electronic device runs the target application in response to the first instruction, where the electronic device cannot access first data through the target application, and the first data is data accessible to the target application after the electronic device successfully authenticates the first instruction; the electronic device receives authentication information; and the electronic device accesses the first data through the target application when the authentication information is successfully authenticated.

In this embodiment of this application, the electronic device receives the first instruction instructing to open the target application, and the electronic device authenticates security of the first instruction. If the authentication fails, the electronic device can still run the target application, but the target application cannot access the first data. The first data is user data accessible to the target application after the authentication succeeds. The electronic device continuously authenticates input information or an input instruction. When the electronic device successfully authenticates received authentication information, the target application run on the electronic device can access the first data. In this way, by continuously detecting the input instruction or information, the electronic device provides different access permissions for an application program based on whether the authentication succeeds, thereby improving security of accessing the application program.

In addition, when the security authentication fails, the electronic device can still provide a user with a permission to use the application program. In this embodiment of this application, a voiceprint authentication manner is used to resolve a problem that when the electronic device is in a lock screen state, an application program can be accessed only after the electronic device is unlocked first. In this embodiment of this application, when the target application cannot access user data in a running process, in a manner of continuously performing authentication until the authentication succeeds, the electronic device can switch, without being perceived by the user, to a mode in which the target application can access the user data, thereby improving user experience.

With reference to the first aspect, in some embodiments, before the electronic device receives the first instruction, the electronic device is in a lock screen state; and that the electronic device receives a first instruction includes: The electronic device receives the first instruction in the lock screen state. Specifically, the electronic device is in the lock screen state when receiving the first instruction. The electronic device recognizes an operation instruction (opening the target application) corresponding to the first instruction. The target application can be opened only after the electronic device is unlocked. However, in this case, the electronic device is in the lock screen state. Therefore, the electronic device performs security authentication on the first instruction. Herein, an application scenario in which the electronic device is in the lock screen state is provided to resolve the problem that an application program can be accessed only after the electronic device is unlocked first.

In some embodiments, the electronic device is in an unlock state when receiving the first instruction. The first instruction received by the electronic device is a voice signal. The electronic device determines a distance between a location of a sound source (the user) of the voice signal and a location of the electronic device based on the voice signal. When the distance between the electronic device and the sound source of the voice signal is within a first threshold, the electronic device may directly execute the first instruction. When the distance between the electronic device and the sound source of the voice signal exceeds the first threshold, the electronic device performs security authentication on the first instruction. Herein, an application scenario in which the user wants to start an application program when the electronic device is relatively far away from the user is provided to resolve the problem that the application program can be accessed only after the electronic device is unlocked first.

With reference to the first aspect, in some embodiments, the first instruction is a voice instruction. Optionally, the first instruction may alternatively be a user operation such as tapping, sliding, a gesture, or a floating gesture, or may be a voice signal, an image signal, or the like.

With reference to the first aspect, in some embodiments, that the electronic device fails to authenticate the first instruction includes: The electronic device extracts a voiceprint feature of the first instruction by using a voiceprint recognition technology; the electronic device performs similarity calculation on the voiceprint feature of the first instruction and a voiceprint model of an owner; and if the electronic device detects that a similarity of the first instruction does not reach a first threshold, the electronic device fails to authenticate the first instruction. An implementation principle of authenticating the voice signal by the electronic device is described herein.

With reference to the first aspect, in some embodiments, the authentication information includes voice data, fingerprint data, facial data, password data, or a user operation instruction.

With reference to the first aspect, the first data is data in a first running environment, and that the electronic device runs the target application in response to the first instruction includes: The electronic device runs the target application in a second running environment in response to the first instruction, where the target application run in the second running environment cannot access the first data in the first running environment. An initialized application program is copied in the second running environment, and the target application run in the second running environment does not have the user data (the first data). The first running environment is a running space of the application program after the electronic device is unlocked, and the target application run in the first running environment has the user data (the first data). When the electronic device fails to authenticate the first instruction or skips authenticating the first instruction, the electronic device runs the application program in the second running environment, and can still provide the user with a permission to use the application program. However, in this case, the application program cannot access the first data. In this way, access convenience of the application program is provided while access security is ensured.

In some embodiments, that the electronic device accesses the first data through the target application when the authentication information is successfully authenticated includes: The electronic device runs the target application in the first running environment when the authentication information is successfully authenticated, where the target application run in the first running environment can access the first data. Specifically, when the electronic device detects that the authentication information is successfully authenticated, the electronic device switches from the second running environment to the first running environment to start the target application. In this case, the target application can access the first data. In other words, by continuously performing authentication until the authentication succeeds, the electronic device can switch, without being perceived by the user, to a mode in which the target application can access the user data, thereby improving user experience.

With reference to the first aspect, in some embodiments, after the electronic device runs the target application in response to the first instruction, and before the electronic device receives the authentication information, the method further includes: The electronic device receives a user operation for the target application, and the electronic device generates second data of the target application based on the user operation. The second data and the first data are isolated from each other and do not interfere with each other.

In some embodiments, the method further includes: When the authentication information is successfully authenticated, the electronic device combines the second data into the first data. Specifically, when the target application cannot access the first data, the electronic device generates the second data when running the target application. When the authentication information is successfully authenticated, the target application can access the first data. In addition, the electronic device synchronously combines the second data into the first data. In this way, the user can use the target application seamlessly before and after the authentication, thereby improving user experience.

In some embodiments, the method further includes: The electronic device deletes the second data when the authentication information is successfully authenticated. Herein, when the target application cannot access the first data, the electronic device generates the second data when running the target application. When the authentication information is successfully authenticated, the target application can access the first data. In addition, the electronic device synchronously deletes the second data to protect user privacy.

With reference to the first aspect, in some embodiments, that an electronic device receives a first instruction includes: The electronic device receives the first instruction sent by another device.

According to a second aspect, this application provides an electronic device, including one or more processors and one or more memories. The one or more memories are coupled to the one or more processors. The one or more memories are configured to store computer program code, and the computer program code includes computer instructions. When the computer instructions are run on the processor, the electronic device is enabled to perform the following operations: receiving a first instruction, where the first instruction is used to open a target application; failing to authenticate the first instruction or skipping authenticating the first instruction; running the target application in response to the first instruction, where the electronic device cannot access first data through the target application, and the first data is data accessible to the target application after the electronic device successfully authenticates the first instruction; receiving authentication information; and accessing the first data through the target application when the authentication information is successfully authenticated.

In this embodiment of this application, the electronic device receives the first instruction instructing to open the target application, and the electronic device authenticates security of the first instruction. If the authentication fails, the electronic device can still run the target application, but the target application cannot access the first data. The first data is user data accessible to the target application after the authentication succeeds. The electronic device continuously authenticates input information or an input instruction. When the electronic device successfully authenticates received authentication information, the target application run on the electronic device can access the first data. In this way, by continuously detecting the input instruction or information, the electronic device provides different access permissions for an application program based on whether the authentication succeeds, thereby improving security of accessing the application program.

In addition, when the security authentication fails, the electronic device can still provide a user with a permission to use the application program. In this embodiment of this application, a voiceprint authentication manner is used to resolve a problem that when the electronic device is in a lock screen state, an application program can be accessed only after the electronic device is unlocked first. In this embodiment of this application, when the target application cannot access user data in a running process, in a manner of continuously performing authentication until the authentication succeeds, the electronic device can switch, without being perceived by the user, to a mode in which the target application can access the user data, thereby improving user experience.

With reference to the second aspect, in some embodiments, before the electronic device receives the first instruction, the electronic device is in a lock screen state; and that the electronic device receives a first instruction includes: The electronic device receives the first instruction in the lock screen state. Specifically, the electronic device is in the lock screen state when receiving the first instruction. The electronic device recognizes an operation instruction (opening the target application) corresponding to the first instruction. The target application can be opened only after the electronic device is unlocked. However, in this case, the electronic device is in the lock screen state. Therefore, the electronic device performs security authentication on the first instruction. Herein, an application scenario in which the electronic device is in the lock screen state is provided to resolve the problem that an application program can be accessed only after the electronic device is unlocked first.

In some embodiments, the electronic device is in an unlock state when receiving the first instruction. The first instruction received by the electronic device is a voice signal. The electronic device determines a distance between a location of a sound source (the user) of the voice signal and a location of the electronic device based on the voice signal. When the distance between the electronic device and the sound source of the voice signal is within a first threshold, the electronic device may directly execute the first instruction. When the distance between the electronic device and the sound source of the voice signal exceeds the first threshold, the electronic device performs security authentication on the first instruction. Herein, an application scenario in which the user wants to start an application program when the electronic device is relatively far away from the user is provided to resolve the problem that the application program can be accessed only after the electronic device is unlocked first.

With reference to the second aspect, in some embodiments, the first instruction is a voice instruction. Optionally, the first instruction may alternatively be a user operation such as tapping, sliding, a gesture, or a floating gesture, or may be a voice signal, an image signal, or the like.

With reference to the second aspect, in some embodiments, that the electronic device fails to authenticate the first instruction includes: The electronic device extracts a voiceprint feature of the first instruction by using a voiceprint recognition technology; the electronic device performs similarity calculation on the voiceprint feature of the first instruction and a voiceprint model of an owner; and if the electronic device detects that a similarity of the first instruction does not reach a first threshold, the electronic device fails to authenticate the first instruction. An implementation principle of authenticating the voice signal by the electronic device is described herein.

With reference to the second aspect, in some embodiments, the authentication information includes voice data, fingerprint data, facial data, password data, or a user operation instruction.

With reference to the second aspect, the first data is data in a first running environment, and that the electronic device runs the target application in response to the first instruction includes: running the target application in a second running environment in response to the first instruction, where the target application run in the second running environment cannot access the first data in the first running environment. An initialized application program is copied in the second running environment, and the target application run in the second running environment does not have the user data (the first data). The first running environment is a running space of the application program after the electronic device is unlocked, and the target application run in the first running environment has the user data (the first data). When the electronic device fails to authenticate the first instruction or skips authenticating the first instruction, the electronic device runs the application program in the second running environment, and can still provide the user with a permission to use the application program. However, in this case, the application program cannot access the first data. In this way, access convenience of the application program is provided while access security is ensured.

In some embodiments, the accessing the first data through the target application when the authentication information is successfully authenticated includes: running the target application in the first running environment when the authentication information is successfully authenticated, where the target application run in the first running environment can access the first data. Specifically, when the electronic device detects that the authentication information is successfully authenticated, the electronic device switches from the second running environment to the first running environment to start the target application. In this case, the target application can access the first data. In other words, by continuously performing authentication until the authentication succeeds, the electronic device can switch, without being perceived by the user, to a mode in which the target application can access the user data, thereby improving user experience.

With reference to the second aspect, in some embodiments, after the electronic device runs the target application in response to the first instruction, and before the electronic device receives the authentication information, the electronic device further performs the following operations: receiving a user operation for the target application; and generating, by the electronic device, second data of the target application based on the user operation, where the second data and the first data are isolated from each other and do not interfere with each other.

In some embodiments, the electronic device is further configured to combine the second data into the first data when the authentication information is successfully authenticated. Specifically, when the target application cannot access the first data, the electronic device generates the second data when running the target application. When the authentication information is successfully authenticated, the target application can access the first data. In addition, the electronic device synchronously combines the second data into the first data. In this way, the user can use the target application seamlessly before and after the authentication, thereby improving user experience.

In some embodiments, the electronic device is further configured to delete the second data when the authentication information is successfully authenticated. Herein, when the target application cannot access the first data, the electronic device generates the second data when running the target application. When the authentication information is successfully authenticated, the target application can access the first data. In addition, the electronic device synchronously deletes the second data to protect user privacy.

With reference to the second aspect, in some embodiments, that an electronic device receives a first instruction includes: The electronic device receives the first instruction sent by another device.

According to a third aspect, an embodiment of this application provides a computer storage medium, including computer instructions. When the computer instructions are run on an electronic device, a communication apparatus is enabled to perform the access control method according to any possible implementation of any one of the foregoing aspects.

According to a fourth aspect, an embodiment of this application provides a computer program product. When the computer program product runs on a computer, the computer is enabled to perform the access control method according to any possible implementation of any one of the foregoing aspects.

DETAILED DESCRIPTION OF THE EMBODIMENTS

The following describes technical solutions in embodiments of this application with reference to the accompanying drawings. In descriptions of the embodiments of this application, "/" means "or" unless otherwise specified. For example, A/B may represent A or B. In this specification, the term "and/or" is used only to describe an association relationship between associated objects, and represents that three relationships may exist. For example, A and/or B may represent the following three cases: Only A exists, both A and B exist, and only B exists. In addition, in the descriptions of the embodiments of this application, "a plurality of" means two or more.

In the following, the terms "first" and "second" are merely intended for a purpose of description, and shall not be understood as an indication or implication of relative importance or implicit indication of a quantity of indicated technical features. Therefore, features defined by "first" and "second" may explicitly or implicitly include one or more of the features. In the descriptions of the embodiments of this application, "a plurality of" means two or more unless otherwise specified. The terms "middle", "left", "right", "up", "down", and the like indicate an orientation or a location relationship based on an orientation or a location relationship shown in the accompanying drawings, and are merely intended to facilitate description of this application and simplify description, but do not indicate or imply that a specified apparatus or element needs to have a specific orientation or be constructed and operated in a specific orientation. Therefore, the terms cannot be understood as a limitation on this application.

The following first describes an electronic device 100 in the embodiments of this application.

The electronic device 100 may be a mobile phone, a tablet computer, a desktop computer, a laptop computer, a notebook computer, an ultra-mobile personal computer (UMPC), a handheld computer, a netbook, a personal digital assistant (PDA), a virtual reality device, a PDA (Personal Digital Assistant, also referred to as a palmtop), a portable internet device, a data storage device, a camera or wearable device (for example, a wireless headset, a smart watch, a smart bracelet, smart glasses, a head-mounted device (Head-mounted display, HMD), electronic clothing, an electronic bracelet, an electronic necklace, an electronic accessory, an electronic tattoo, or a smart mirror), or the like.

Figure 1:
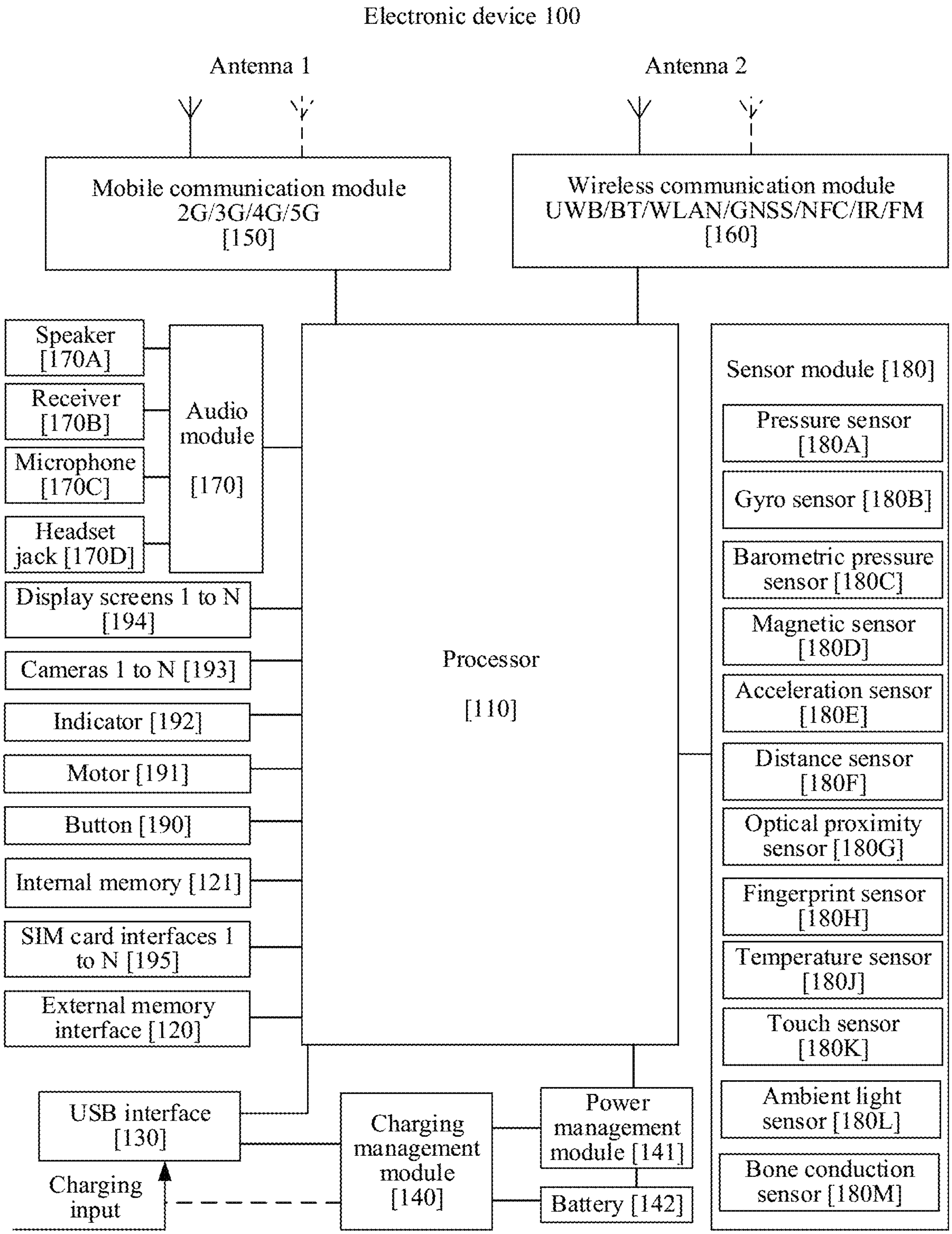
FIG. 1 is a schematic diagram of a hardware structure of an electronic device according to an embodiment of this application.

FIG. 1 is a schematic diagram of a structure of an example of an electronic device 100 according to an embodiment of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, an headset jack 170D, a sensor module 180, a button 190, a motor 191, an indicator 192, a camera 193, a display screen 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the electronic device 100. In some other embodiments of this application, the electronic device 100 may include more or fewer components than those shown in the figure, some components may be combined, some components may be split, or a different component arrangement may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a timing signal to complete control of instruction fetching and instruction execution.

The processor 110 may further be provided with a memory, configured to store instructions and data. In some embodiments, the memory in the processor 110 is a cache memory. The memory may store instructions or data recently used or repeatedly used by the processor 110. If the processor 110 needs to use the instructions or the data again, the processor 110 may directly invoke the instructions or the data from the memory to avoid repeated access, and reduce a waiting time of the processor 110, thereby improving system efficiency.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDL) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface to implement a touch function of the electronic device 100.

The I2S interface may be used to perform audio communication. In some embodiments, the processor 110 may include a plurality of groups of I2S buses. The processor 110 may be coupled to the audio module 170 through the I2S bus to implement communication between the processor 110 and the audio module 170. In some embodiments, the audio module 170 may transmit an audio signal to the wireless communication module 160 through the I2S interface to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface to implement a Bluetooth function. In some embodiments, the audio module 170 may transmit an audio signal to the wireless communication module 160 through the UART interface to implement a function of playing music through a Bluetooth headset.

The MIPI interface may be configured to connect the processor 110 to a peripheral component such as the display screen 194 or the camera 193. The MIPI interface includes a camera serial interface (CSI), a display serial interface (DSI), and the like. In some embodiments, the processor 110 communicates with the camera 193 through the CSI interface to implement a photographing function of the electronic device 100. The processor 110 communicates with the display screen 194 via the DSI interface to implement a display function of the electronic device 100.

The GPIO interface may be configured by software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may further be configured to connect to another electronic device such as an AR device.

It can be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or may use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140 to supply power to the processor 110, the internal memory 121, an external memory, the display screen 194, the camera 193, the wireless communication module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in a same device as the mobile communication module 150 or another functional module.

The wireless communication module 160 may provide a solution applied to the electronic device 100, for wireless communication including a UWB, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 of the electronic device 100 are coupled, and the antenna 2 and the wireless communication module 160 of the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs, which execute program instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N display screens 194, where N is a positive integer greater than 1.

In some embodiments of this application, the display screen 194 displays interface content currently output by a system. For example, the interface content is an interface provided by an instant messaging application.

The electronic device 100 may implement a photographing function through the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element.

The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a format such as standard RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, face recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120 to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (for example, audio data and a phone book) created in a process of using the electronic device 100 and the like. In addition, the internal memory 121 may include a high-speed random access memory, and may further include a non-volatile memory, for example, at least one magnetic disk storage device, a flash memory, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to encode and decode an audio signal. In some embodiments, the audio module 170 may be disposed in the processor 110, or some functional modules in the audio module 170 may be disposed in the processor 110.

The speaker 170A, also referred to as a "loudspeaker", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to voice.

The microphone 170C, also referred to as a "mike" or a "mic", is configured to convert a sound signal into an electrical signal. When making a call or sending a voice message, a user may make a sound near the microphone 170C through the mouth of the user to input a sound signal to the microphone 170C. At least one microphone 170C may be disposed in the electronic device 100. In some other embodiments, two microphones 170C may be disposed in the electronic device 100 to collect a sound signal and implement a noise reduction function. In some other embodiments, three, four, or more microphones 170C may alternatively be disposed in the electronic device 100 to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display screen 194. In some optional embodiments of this application, the pressure sensor 180A may be configured to: capture a pressure value generated when a finger part of the user touches the display screen, and transmit the pressure value to the processor, so that the processor identifies the finger part through which the user enters the user operation.

There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display screen 194, the electronic device 100 detects intensity of the touch operation through the pressure sensor 180A. The electronic device 100 may also calculate a touch position based on a detection signal of the pressure sensor 180A. In some embodiments, different touch positions may correspond to different operation instructions. In some optional embodiments, the pressure sensor 180A may further calculate a quantity of touch points based on a detected signal, and transmit a calculated value to the processor, so that the processor identifies whether the user enters a user operation by using a single finger or a plurality of fingers.

The gyro sensor 180B may be configured to determine a moving posture of the electronic device 100. In some embodiments, an angular velocity of the electronic device 100 around three axes (namely, axes X, Y, and Z of the electronic device) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may further be used in a navigation scenario and a somatic game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a leather flip cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may further be configured to identify a posture of the electronic device, and is applied to horizontal and vertical screen switching and an application such as a pedometer. In some optional embodiments of this application, the acceleration sensor 180E may be configured to: capture an acceleration value generated when a finger part of the user touches the display screen (or a finger of the user taps a rear side bezel of a side bezel of the electronic device 100), and transmit the acceleration value to the processor, so that the processor identifies the finger part through which the user enters a user operation.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When plenty of reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a display screen to reduce power consumption. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display screen 194 based on the sensed ambient light brightness. The ambient light sensor 180L may further be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display screen 194, and the touch sensor 180K and the display screen 194 constitute a touchscreen, which is also referred to as a "touch screen". The touch sensor 180K is configured to detect a touch operation performed on or near the touch sensor 180K. The touch operation is an operation that the user touches the display screen 194 by using a hand, an elbow, a stylus, or the like. The touch sensor may transfer the detected touch operation to the application processor to determine a type of a touch event. A visual output related to the touch operation may be provided through the display screen 194. In some other embodiments, the touch sensor 180K may alternatively be disposed on a surface of the electronic device 100, in a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively be in contact with a body pulse to receive a blood pressure beating signal. In some embodiments, the bone conduction sensor 180M may alternatively be disposed in the headset to obtain a bone conduction headset. The audio module 170 may obtain a voice signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio play) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195 to implement contact with or separation from the electronic device 100.

In some application scenarios, when it is inconvenient for the user to operate the electronic device 100 in a touch manner, the user may operate and control the electronic device 100 by using the voice assistant application. The voice assistant application is an application that performs voice recognition (Automatic Speech Recognition, ASR) and semantic understanding (Natural Language Processing, NLP) on a received voice signal, and converts, based on understood semantic information, the voice signal into a corresponding operation instruction. In some embodiments, the user starts the voice assistant application by using a preset wakeup word in the voice assistant application. When the voice assistant application receives a voice signal input by the user, the voice assistant application invokes the electronic device 100 to perform an operation corresponding to the voice signal. For example, the preset wakeup word of the voice assistant application is "Xiaoyi Xiaoyi". The user calls out "Xiaoyi Xiaoyi", the voice assistant application receives the voice signal (Xiaoyi Xiaoyi), and the voice assistant application outputs the voice "I am here" in response to the voice signal. Then, the user calls out "Help me open the music player application", the voice assistant application receives the voice signal (Help me open the music player application), the voice assistant application invokes, in response to the voice signal, the electronic device 100 to open the music player application, and the electronic device 100 opens the music player application.

However, in the foregoing scenario, when it is inconvenient for the user to control the electronic device 100 in a touch manner, the electronic device 100 is generally in a screen lock state. Screen locking is a manner for locking the screen in the electronic device 100, and can protect device security. The user needs to enter a preset password in the electronic device 100 or perform authentication such as face authentication or fingerprint authentication to unlock and use the electronic device 100. In the lock screen state, after the user starts the voice assistant application by using the preset wakeup word, the voice assistant application receives a voice signal input by the user, and the voice assistant application cannot invoke the electronic device 100 to perform a corresponding operation when the electronic device 100 is in the lock screen state. For example, the user calls out "Xiaoyi Xiaoyi", and the voice assistant application outputs the voice "I am here". Then the user calls out "Help me open the music player application", and the voice assistant application receives the voice signal (Help me open the music player application), and invokes the electronic device 100 to open the music player application. However, the electronic device 100 cannot open the music player application in the lock screen state. In this case, the voice assistant application outputs the voice "Please unlock the electronic device 100 first". After the user unlocks the electronic device 100 (in an unlocking manner such as a password, a face, or a fingerprint), the electronic device 100 opens the music player application.

It can be learned that the user can access and control the electronic device 100 by using a voice only after the electronic device 100 is in an unlock screen state. However, when the user needs to control the electronic device 100 by using voice, it is usually when it is inconvenient for the user to operate the electronic device 100 in a touch manner or the electronic device 100 is not at the hand of the user. In these scenarios, the electronic device 100 is usually in the lock screen state, and the user needs to unlock the electronic device 100 before performing an operation. This loses voice convenience.

In a current unlocking manner, the electronic device 100 may be unlocked in a voiceprint recognition manner. The voiceprint is a voice feature that is included in voice and that can represent and identify a speaker, and the voiceprint recognition is a process of recognizing, based on a voiceprint feature of to-be-recognized voice, a speaker corresponding to the voice. Voice of an owner is recorded in the electronic device 100 in advance. After a series of operations such as feature extraction and model training, the voice is mapped as a voiceprint model of the owner of the electronic device 100. Then, the electronic device 100 may perform voiceprint recognition on an obtained voice signal, and also extract a feature of the voice signal. The electronic device 100 performs similarity calculation on the feature of the voice signal and the voiceprint model of the owner to obtain a matching degree score. If the score is greater than a set threshold, it is considered that a speaker of the voice signal matches an identity of the owner, and the electronic device 100 is unlocked. Otherwise, the electronic device 100 cannot be unlocked.

However, voiceprint authentication is an authentication manner with relatively low security. If another person has a voice recording of the owner, the electronic device 100 may be unlocked. In addition, a current voiceprint recognition technology also has problems of a low recognition rate, a high recognition error rate, and a poor anti-interference capability.

An embodiment of this application provides an access control method to access an application program of the electronic device 100 securely. In this embodiment of this application, the electronic device 100 receives a first instruction input by a user, and the first instruction is used to instruct the electronic device to open a target application. The electronic device 100 performs security detection on the first instruction. If a security level of the first instruction does not reach a preset level, the electronic device 100 starts the target application in a second running environment. The second running environment herein is an independent running space of the electronic device 100, and the running space includes an initialized application program of the target application. The electronic device 100 continuously performs security detection. Subsequently, when the electronic device 100 receives authentication information, the electronic device 100 performs security detection on the authentication information. If a security level of the authentication information reaches the preset level, the electronic device 100 starts the target application in a first running environment. The first running environment herein is a running space different from the second running environment. The first running environment and the second running environment are independent of each other and do not interfere with each other. The first running environment includes an application program, having user data, of the target application. The first running environment may be understood as the running space obtained after the electronic device 100 is unlocked.

In this way, the electronic device 100 provides different running environments based on different security levels by continuously detecting an instruction input by the user, thereby improving security of accessing an application program.

In some embodiments, the first instruction may be, for example, a voice signal, and the electronic device 100 performs security detection on the voice signal through voiceprint recognition. If a voice matching degree between the voice signal and an owner of the electronic device 100 does not reach a first threshold (that is, a security level does not reach the preset level), the electronic device 100 starts the second running environment. The electronic device 100 continuously performs voiceprint recognition on a subsequently input voice signal (authentication information). When an unlocking security level (the preset level) is reached or other authentication information (for example, password authentication information, face authentication information, or fingerprint authentication information) is received, the electronic device 100 unlocks the first running environment and converts user data in the second running environment to user data in the first running environment for continued use.

In some embodiments, the first instruction may be, for example, a user operation instruction (including a physical button, a motion sensor change, touch interaction, non-semantic sound triggering (airflow sound), and the like). There is a preset mapping relationship between the user operation and the target application. The electronic device 100 starts the second running environment based on the user operation instruction. The electronic device 100 continuously performs security detection. When detecting that subsequently received authentication information reaches the unlocking security level (the preset level) or other identity authentication information (for example, password authentication information, face authentication information, or fingerprint authentication information) is received, the electronic device 100 unlocks the first running environment and converts user data in the second running environment to user data in the first running environment for continued use.

With reference to application scenarios, the following describes, by using an example in which the electronic device 100 is a smartphone, an implementation form, on a display interface of the electronic device 100 in a specific embodiment, of the access control method provided in this application.

Scenario 1: The electronic device 200 opens a music player application through a voice instruction in a lock screen state.

As shown in FIG. 2*a* to FIG. 2*d*, FIG. 2*a* shows a process in which a user wakes up the voice assistant application of the electronic device 100. The preset wakeup word of the voice assistant application is "Xiaoyi Xiaoyi". The user calls out "Xiaoyi Xiaoyi", the voice assistant application receives the voice signal (Xiaoyi Xiaoyi), and the voice assistant application outputs the voice "I am here" in response to the voice signal.

Figure 2A:
FIG. 2*a* to FIG. 2*f* are schematic diagrams of a group of application interfaces according to an embodiment of this application.
Figure 2B:
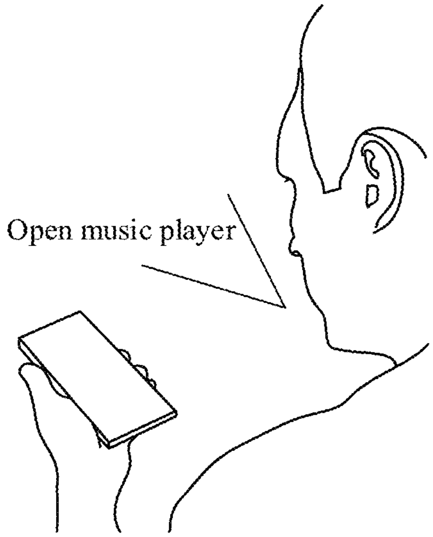

Then, the user shown in FIG. 2*b* continues to call out "open the music player", the voice assistant application receives the voice signal (open the music player), the voice assistant application invokes, in response to the voice signal, the electronic device 100 to open the music player.

Before the electronic device 100 opens the music player, the electronic device 100 performs security authentication on the received voice signal in a manner of voiceprint recognition. If a voiceprint matching degree of the voice signal does not reach the first threshold, the electronic device 100 starts the music player application in the second running environment. The music player application in the second running environment is an initialized application program. The electronic device 100 displays a music player application interface 210 shown in FIG. 2*c*. The music player application interface 210 includes a status bar 201, a search bar 202, an interface navigation bar 203, and music recommendation information (for example, including singer recommendation, pop hits, playlist recommendation, radio recommendation, and latest song recommendation).

The status bar 201 may include one or more signal strength indicators of a mobile communication signal (which may also be referred to as a cellular signal), one or more signal strength indicators of a wireless fidelity (Wi-Fi) signal, a battery status indicator, and a time indicator.

The search bar 202 is configured to search for a text, a voice, a picture, or the like entered by the user.

Figure 2C:
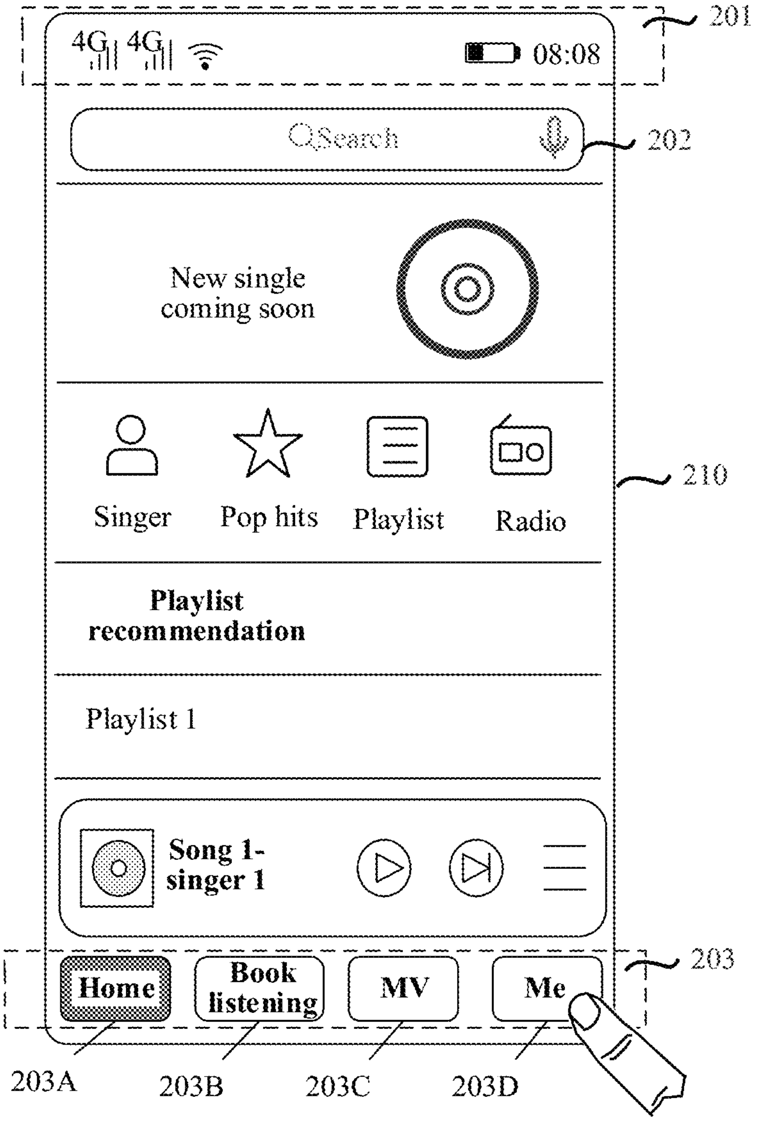

The interface navigation bar 203 provides shortcut controls of a plurality of interfaces. For example, a "home" control 203A, a "book listening" control 203B, an "MV" control 203C, and a "me" control 203D may be included. When a user operation performed on an icon of any control in the interface navigation bar 203 is detected, the electronic device 100 may display a corresponding interface in response to the operation. In FIG. 2*c*, an icon of the home control 203A is marked to prompt the user that a currently displayed interface is the home interface.

Figure 2D:
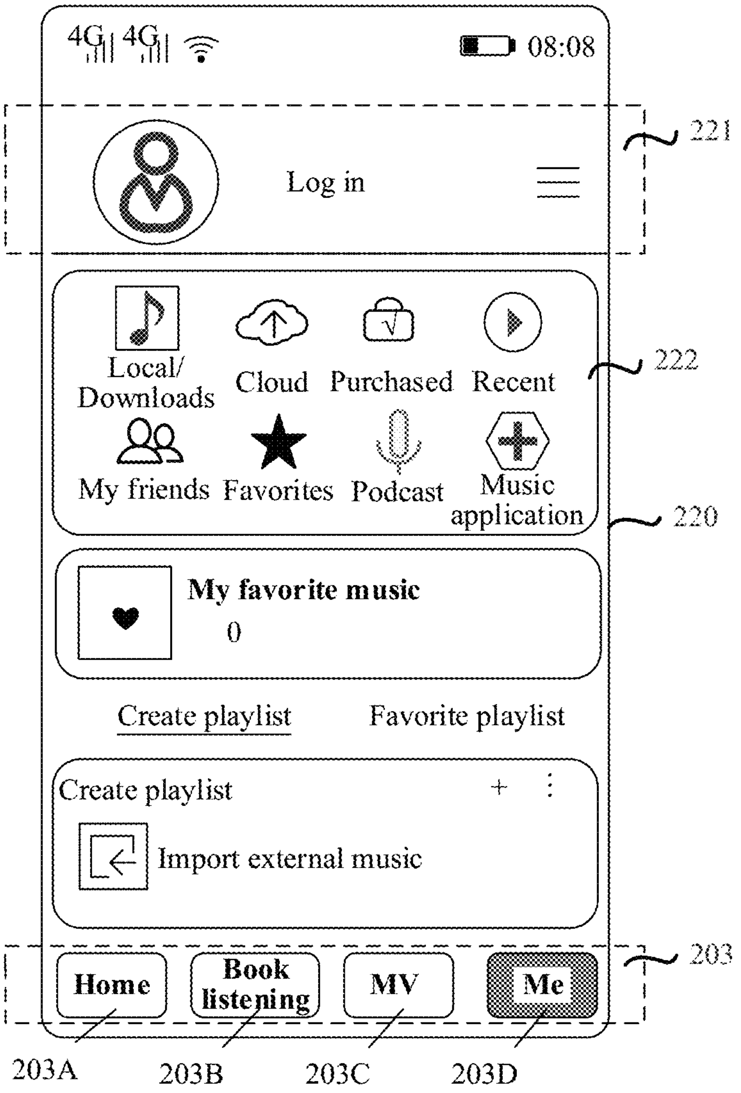

The electronic device 100 detects a user operation on the "me" control 203D, and the electronic device 100 displays a "me" interface 220 shown in FIG. 2*d*. The interface 220 includes modules such as a user information bar 221, a function bar 222, and an interface navigation bar 203. An icon of the control 203D in the interface navigation bar 203 is marked to prompt the user that a currently displayed interface is the "me" interface 220.

The function bar 222 provides a plurality of function controls, for example, a local/downloads control (used to view a downloaded music file in the electronic device 100), a cloud disk control (used to view a music file uploaded by the electronic device 100 to a cloud disk), a purchased control (used to view a purchased music file in the electronic device 100), a recent play control (used to view a recently played music file in the electronic device 100), and a my friends control (used to view friend information of a logged-in user).

The user information bar 221 is used to display personal information of a currently logged-in user. In this case, the electronic device 100 starts the music player application in the second running environment, and the music player application in the second running environment is an initialized application program. It can be learned that, on the "me" interface 220 shown in FIG. 2*d*, there is no personal information logged in by the user, that is, the music player application in this case is in a non-login state. In other words, in this case, the user can normally use the music player application, but cannot obtain user data in the music player application.

In some embodiments, if the user wants to log in, the user may tap the user information bar 221. When the electronic device 100 detects a user operation on the user information bar 221, the electronic device 100 may prompt the user to perform unlocking authentication. Optionally, a prompt manner may be providing a password input interface, a fingerprint input interface, or a face recognition interface, may be guiding the user to input a voice signal (for example, asking the user about a login account via voice, or prompting the user to enter a corresponding voice password), or so on.

Figure 2E:

The electronic device 100 starts the music player application in the second running environment, and the electronic device 100 may continuously perform security authentication. As shown in FIG. 2*e*, the user continues to call out "Xiaoyi Xiaoyi, play music", the voice assistant application receives the voice signal (Xiaoyi Xiaoyi, play music), and in response to the voice signal, the voice assistant application invokes the electronic device 100 to play music by using the music player application. In addition, the electronic device 100 performs voiceprint recognition on the received voice signal (Xiaoyi Xiaoyi, play music), and if a voiceprint matching degree of the voice signal reaches the first threshold, the electronic device 100 switches from the second running environment to the first running environment. The music player application in the first running environment is an application program having user data.

In some embodiments, the electronic device 100 may accumulate voiceprint matching degrees of a plurality of voice signals in a calculation manner. If an accumulated voiceprint matching degree of the voice signal (Xiaoyi Xiaoyi, play music) and a previous voice signal (open the music player) reaches the first threshold, the electronic device 100 switches from the second running environment to the first running environment.

The electronic device 100 starts a music player application in the first running environment, and the music player application in the first running environment is an application program having user data. In this case, the electronic device 100 displays a music player application interface 230 shown in FIG. 2*f*. The interface 230 includes modules such as a user information bar 231, a function bar 222, and the interface navigation bar 203. An icon of the control 203D in the interface navigation bar 203 is marked to prompt the user that a currently displayed interface is the "me" interface 230.

The user information bar 231 is used to display personal information of a currently logged-in user. In this case, the electronic device 100 starts the music player application in the first running environment, and the music player application in the first running environment is an application program having user data. It can be learned that, on the "me" interface 230 shown in FIG. 2*f*, the music player application is in a logged-in state, and the user information bar 231 displays personal information (the user name is Lisa, and the level is 7) logged in by the user.

In conclusion, FIG. 2*a* to FIG. 2*f* show a continuous authentication process of a voice signal in a process in which the electronic device 100 runs the music player application. When the voiceprint matching degree recognized by the electronic device 100 for the received voice signal does not reach the first threshold, the electronic device 100 starts the music player application in the second running environment. The electronic device 100 continuously authenticates the voice signal input by the user. When the voiceprint matching degree recognized by the electronic device 100 for the received voice signal reaches the first threshold, the electronic device 100 switches from the second running environment to the first running environment to start the music player application. An initialized application program is copied in the second running environment, and the music player application run in the second running environment does not have user data. The first running environment is a running space of an application program after the electronic device 100 is unlocked, and the music player application run in the first running environment has user data. In this way, the electronic device 100 provides different running environments based on different security levels by continuously detecting an instruction input by the user, thereby improving security of accessing an application program.

Scenario 2: The electronic device 200 opens a camera application through continuous authentication in a lock screen state.

Figure 3A:
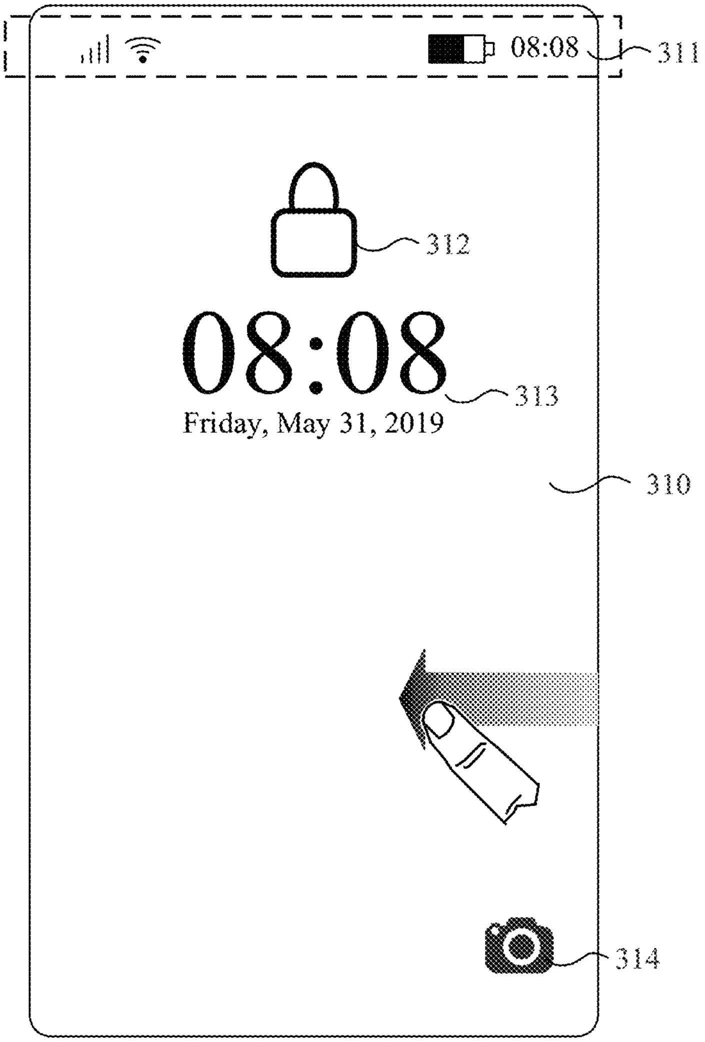
FIG. 3*a* to FIG. 3*c* are schematic diagrams of another group of application interfaces according to an embodiment of this application.

FIG. 3*a* shows an example of a lock screen interface 310. The lock screen interface 310 includes: a status bar 311, a lock screen icon 312, time information 313, and an application icon 314. The status bar 311 includes one or more signal strength indicators of a mobile communication signal (which may also be referred to as a cellular signal), one or more signal strength indicators of a wireless fidelity (Wi-Fi) signal, a battery status indicator, and a time indicator. The lock screen icon 312 indicates that a current interface is a lock screen interface. The time information 313 includes a current time and date. The application icon 314 indicates a camera application, and is used to indicate that the user may open the camera application by sliding left.

When the electronic device 100 receives a left sliding operation on the lock screen interface 310, the electronic device 100 starts the camera application in the second running environment in response to the left sliding operation. The camera application in the second running environment is an initialized application program. In some embodiments, the left sliding operation for opening the camera application may be an operation whose security level does not reach a preset level. In response to the left sliding operation, the electronic device 100 displays a camera application interface 330 shown in FIG. 3*b*. The application interface 330 may include: a display area 320, a zoom rate adjustment area 321, a function bar 322, a mode selection area 323, a gallery icon 324, a photographing icon 325, and a switching icon 326.

The display area 320 displays an image collected by the electronic device through a camera in real time.

The zoom rate adjustment area 321 may also be referred to as a focal length adjustment area, and is used to adjust a photographing focal length of the camera, so as to adjust a display zoom rate of a display picture of the display area 320. The zoom rate adjustment area 321 includes an adjustment sliding block 321A. The adjustment sliding block 321A is used to indicate a display rate. The adjustment sliding block 321A is currently 1×, indicating that a current display rate is 1 time. The user may zoom in or zoom out the display picture of the display area 320 by sliding the adjustment slider 321A in the zoom rate adjustment area 321.

The function bar 322 is used to provide a shortcut function of a camera application, including, for example, enabling smart vision (icon 322A), switching a flash (icon 322B), enabling an AI photography master (icon 322C), switching a color mode (icon 322D), and enabling a camera setting interface (icon 322E).

Figure 3B:
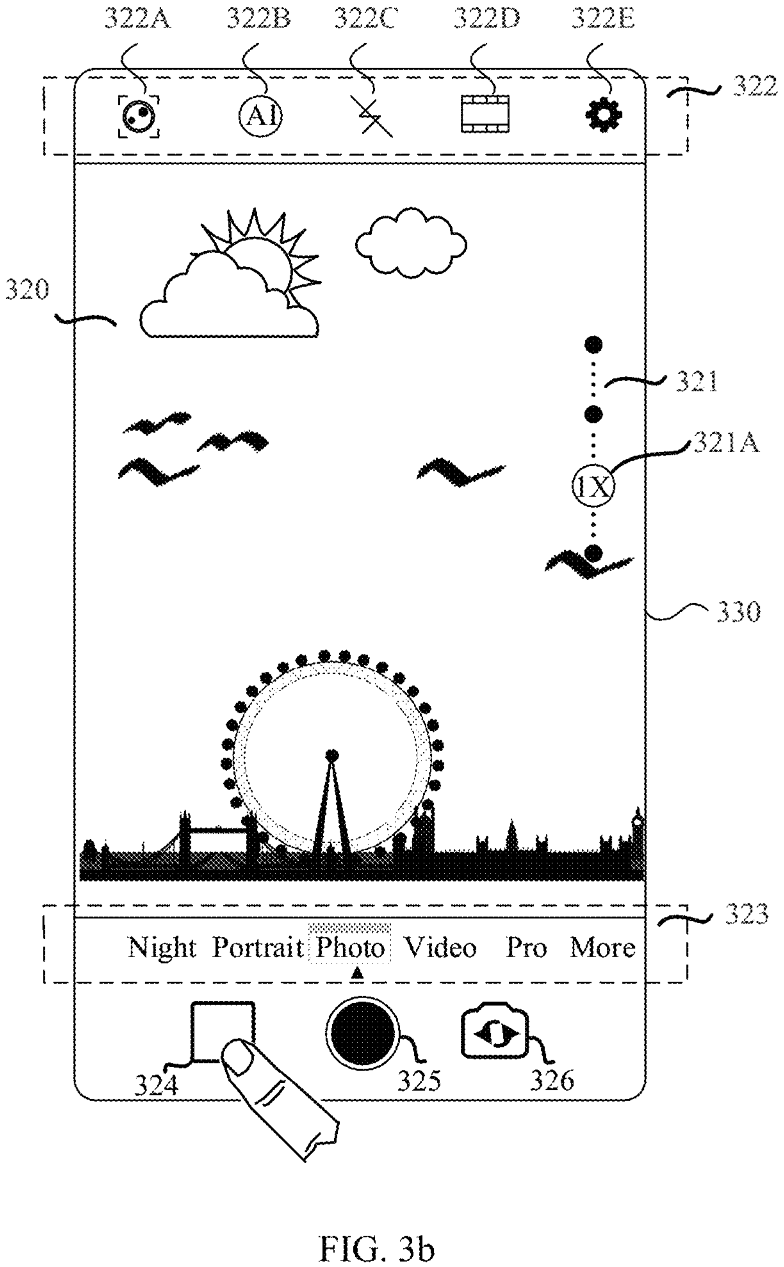

The mode selection area 323 is used to provide different shooting modes, and a camera enabled by the electronic device and a shooting parameter vary based on different shooting modes selected by the user. The shooting modes include a night mode, a portrait mode, a photo mode, a video mode, a pro mode, and more. In FIG. 3*b*, an icon of the photo mode is marked to prompt the user that a current mode is the photo mode. An image displayed in the display area 320 is an image processed in the current mode.

The gallery icon 324 is used to enter a gallery, and the gallery includes a photographed photo and video. The gallery icon 324 may be displayed in different forms. For example, after the electronic device stores an image currently collected by the camera, a thumbnail of the image is displayed in the gallery icon 324. The photographing icon 325 is used to obtain an image currently displayed in the display area 320, and store the image in the gallery. The switching icon 326 is used to switch between a front-facing camera and a rear-facing camera.

Figure 3C:
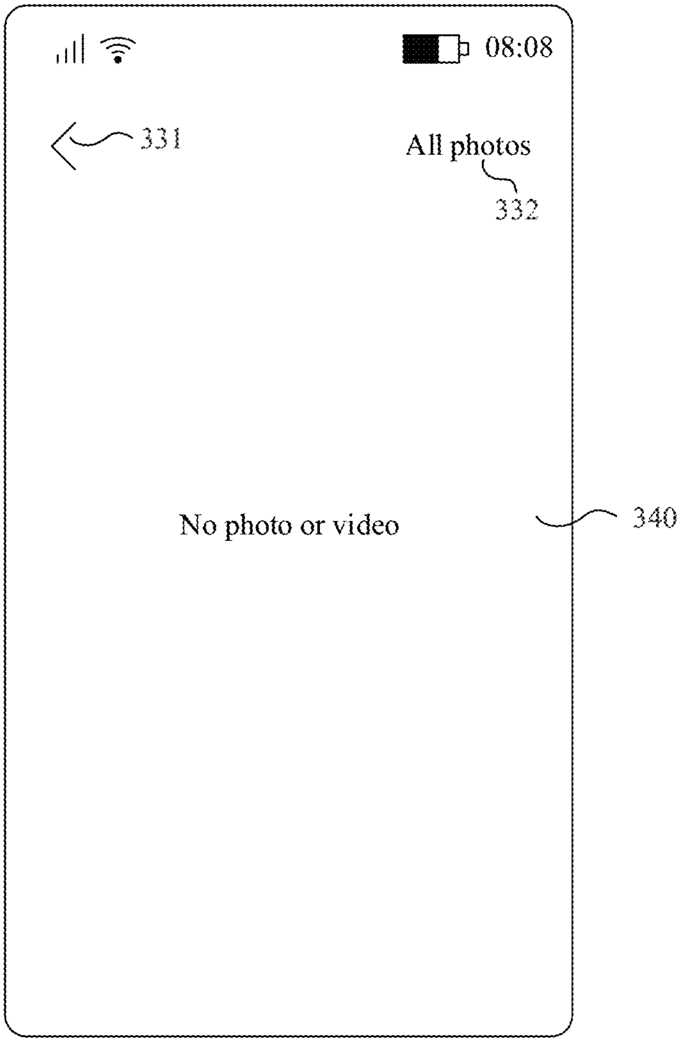

When a user operation performed on the gallery icon 324 is detected, in response to the operation, the electronic device 100 may enter the gallery of the electronic device 100 and display the gallery interface 340 shown in FIG. 3*c*. In this case, the electronic device 100 starts the camera application in the second running environment, and the camera application in the second running environment is an initialized application program. Therefore, it can be learned that there is no photo or video on the gallery interface 340 shown in FIG. 3*c*, that is, the camera application in this case is in an initialized state. In this case, the user can normally use the camera application, but cannot obtain user data in the camera application.

The interface 340 further includes a return control 331 and a photo control 332. The return control 331 is used to return to a previous-level page. When detecting a user operation performed on the return control 331, in response to the operation, the electronic device 100 displays the camera application interface 330 shown in FIG. 3*b*. The photo control 332 is used to view all photos in the electronic device 100. When detecting a user operation performed on the photo control 332, in response to the operation, the electronic device 100 prompts the user to complete unlocking first.

Figure 4A:
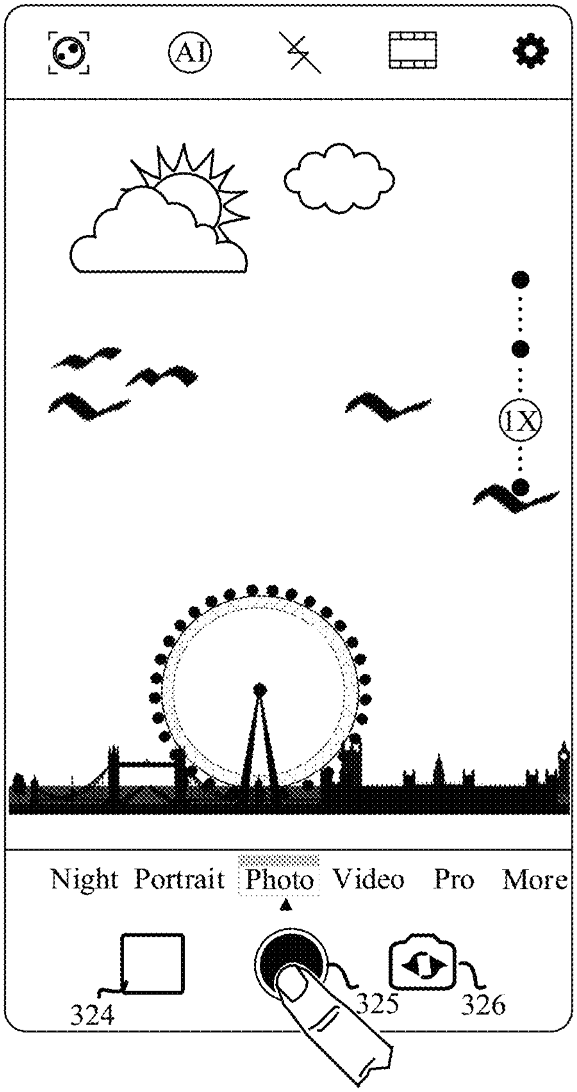
FIG. 4*a* to FIG. 4*d* are schematic diagrams of another group of application interfaces according to an embodiment of this application.

As shown in FIG. 4*a*, when detecting a user operation (such as a touch operation, a voice operation, or a gesture operation) performed on the photographing icon 325, in response to the operation, the electronic device 100 obtains an image currently displayed in the display area 320, and stores the image in the gallery. The electronic device 100 displays an interface 420 shown in FIG. 4*b*. It can be learned that the gallery icon 324 on the interface 420 displays a thumbnail of the image.

Figure 4B:
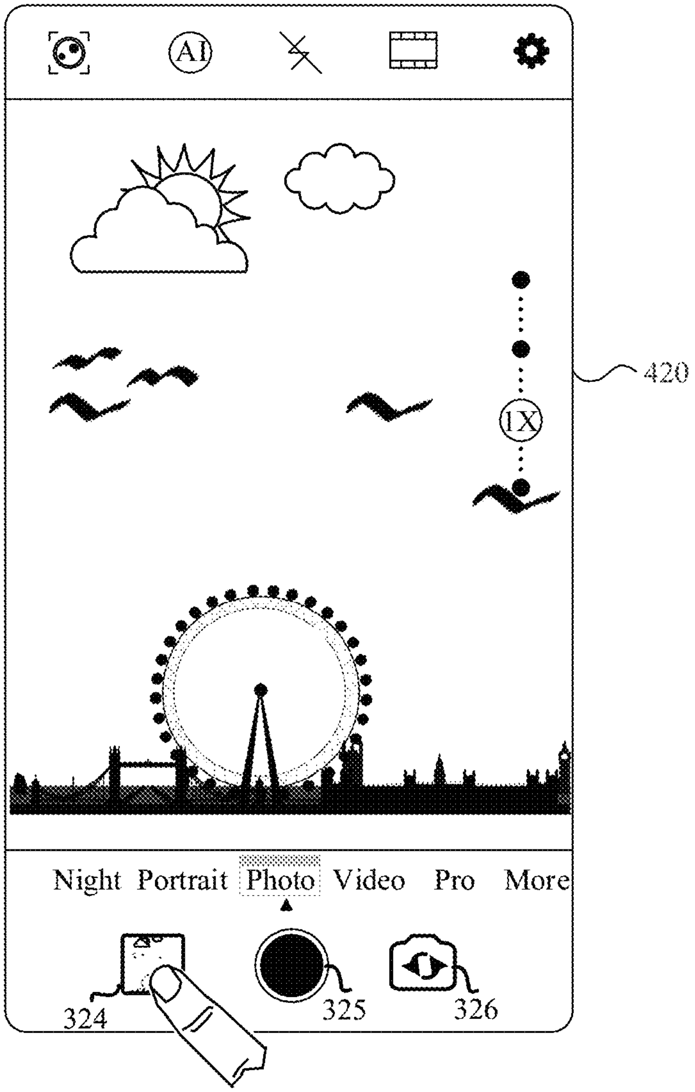

In this case, the user enters the gallery. As shown in FIG. 4*b*, the electronic device 100 receives a user operation performed on the gallery icon 324, and in response to the operation, the electronic device 100 enters the gallery, and displays a gallery interface 430 shown in FIG. 4*c*. The gallery interface 430 includes an image 431 obtained when the photographing icon 325 is pressed.

The electronic device 100 starts the camera application in the second running environment, and the electronic device 100 may continuously perform security authentication. An authentication manner includes fingerprint authentication, voiceprint recognition authentication, face authentication, and the like.

For example, when the electronic device 100 obtains facial data of the user through collection, and detects that a matching degree between the facial data and a face model of the owner reaches a preset level, the electronic device 100 switches from the second running environment to the first running environment. The camera application in the first running environment is an application program having user data. In this embodiment of this application, if the electronic device 100 detects that a current security level reaches a preset level, unlocking is implemented. The first running environment is a running environment after the electronic device 100 is unlocked.

For another example, when the electronic device 100 obtains voice data of the user through collection, and detects that a voiceprint matching degree between the voice data and a voiceprint model of the owner reaches the first threshold, the electronic device 100 switches from the second running environment to the first running environment.

The electronic device 100 starts the camera application in the first running environment, and the camera application in the first running environment is an application program having user data. When the electronic device 100 receives a user operation performed on the gallery icon 324, the electronic device 100 enters the gallery in response to the operation. In this case, the electronic device 100 displays a gallery interface 440 shown in FIG. 4*d*. The gallery interface 440 includes an image 431 and other images. The other images herein are user data. The gallery interface 440 further includes an unlocking prompt box 432. The unlocking prompt box 432 is used to prompt the user that the electronic device 100 is currently in an unlock state, that is, the electronic device 100 switches the camera application from the second running environment to the first running environment for running.

In conclusion, FIG. 3*a* to FIG. 4*d* show a process in which unlocking authentication is continuously performed in a process in which the electronic device 100 runs the camera application in the lock screen state. The electronic device 100 is in the lock screen state. When the electronic device 100 receives a left sliding operation (the left sliding operation does not reach a preset level), the camera application is started in the second running environment. The electronic device 100 continuously performs security authentication. When the matching degree of the facial data/fingerprint data/voice data collected by the electronic device 100 reaches a preset level, the camera application is started in the first running environment. An initialized application program is copied in the second running environment, and the camera application run in the second running environment does not have user data. The first running environment is a running space of an application program after the electronic device 100 is unlocked, and the camera application run in the first running environment has user data.

The first running environment and the second running environment may be two isolated running spaces in the electronic device 100, or may be two isolated running spaces in a same virtual machine; or the second running environment may be one running space in the virtual machine, and the first running environment is not a running space in the virtual machine.

Figure 5:
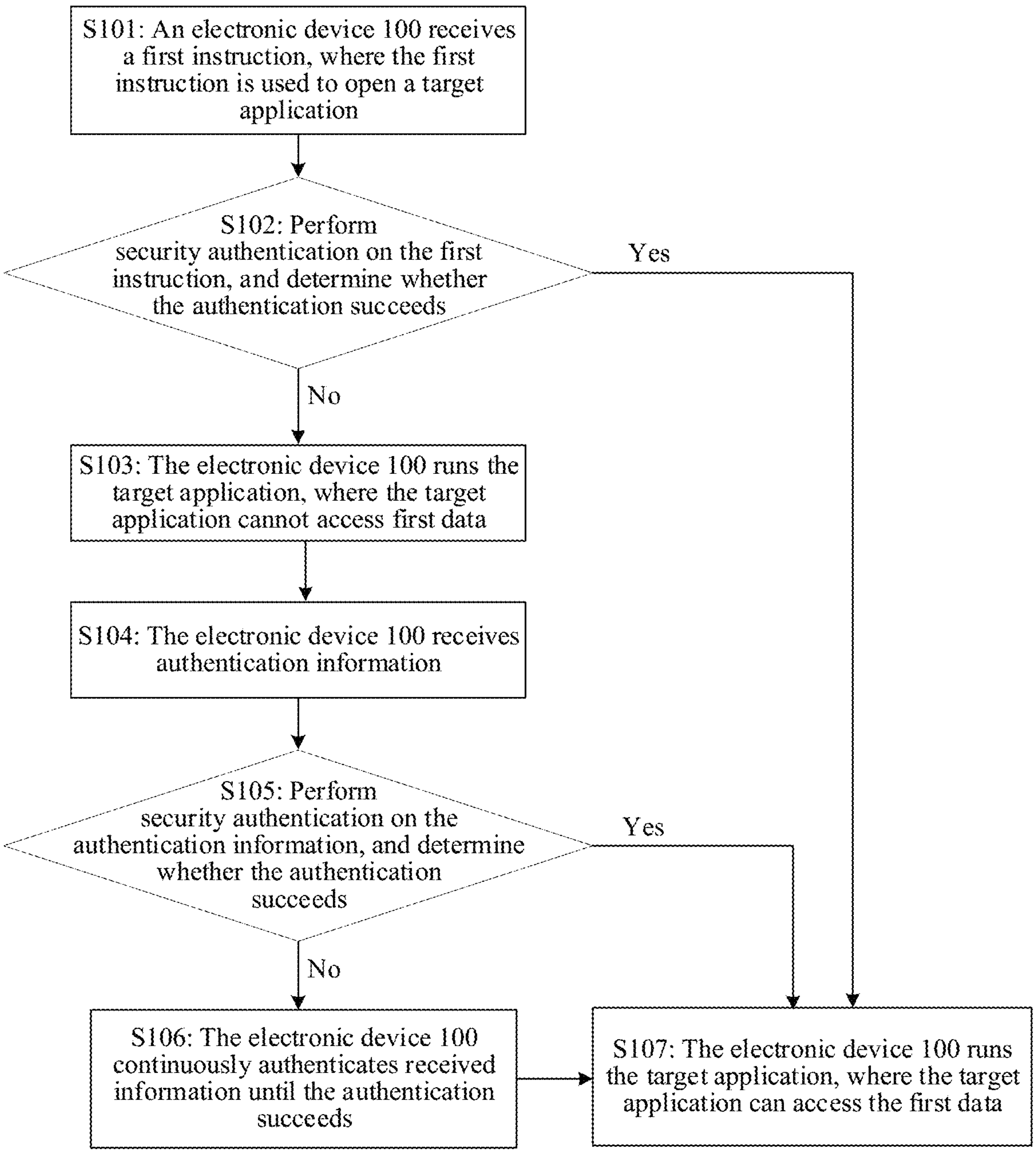
FIG. 5 is a method flowchart of an access control method according to an embodiment of this application.

The following describes a step procedure of an access control method provided in this application. As shown in FIG. 5, the method may include the following steps.

Step S101: An electronic device 100 receives a first instruction, where the first instruction is used to open a target application.

The electronic device 100 receives the first instruction, where the first instruction is used to open the target application. The first instruction may be a user operation such as tapping, sliding, a gesture, or a floating gesture, or may be a voice signal, an image signal, or the like.

In some embodiments, the first instruction is a voice signal, and an operation instruction corresponding to the voice signal is opening the target application. Before the electronic device 100 receives the first instruction, a user inputs a wakeup word via voice, and a voice assistant application of the electronic device 100 receives the first instruction in response to the wakeup word. The voice assistant application performs voice recognition ASR and semantic understanding NLP on the received voice signal, and converts the voice signal into a corresponding operation instruction based on understood semantic information. The operation instruction may be, for example, opening the target application. For example, FIG. 2*a* and FIG. 2*b* shown above show a process of opening the music player (the target application) by using a voice instruction (the first instruction).

In some embodiments, the first instruction is a user operation, and the user operation is used to open the target application. For example, FIG. 3*a* and FIG. 3*b* show a process of opening the camera (the target application) by using a left sliding operation (the first instruction).

In some embodiments, the electronic device 100 receives the first instruction sent by another device. For example, the another device receives a voice signal of a user, and performs voice recognition ASR and semantic understanding NLP on the voice signal. The another device sends the first instruction to the electronic device 100 based on an operation instruction corresponding to the understood voice signal, and invokes the electronic device 100 to execute the operation instruction corresponding to the voice signal.

Step S102: The electronic device 100 performs security authentication on the first instruction, and determines whether the authentication succeeds.

The electronic device 100 performs security authentication on the first instruction, and determines whether the authentication on a security level of the first instruction succeeds. A technical manner for performing security authentication may be face recognition, fingerprint recognition, password recognition, voiceprint recognition, user operation recognition, or the like.

In some embodiments, the electronic device 100 is in the lock screen state when receiving the first instruction. The electronic device 100 recognizes an operation instruction (opening the target application) corresponding to the first instruction. The target application can be opened only after the electronic device 100 is unlocked. However, in this case, the electronic device 100 is in the lock screen state. Therefore, the electronic device 100 performs security authentication on the first instruction.

In some embodiments, the electronic device 100 is in the unlock state when receiving the first instruction. The first instruction received by the electronic device 100 is a voice signal. The electronic device 100 determines a distance between a location of a sound source (the user) of the voice signal and a location of the electronic device 100 based on the voice signal. When the distance between the electronic device 100 and the sound source of the voice signal is within the first threshold, the electronic device 100 may directly execute the first instruction. When the distance between the electronic device 100 and the sound source of the voice signal exceeds the first threshold, the electronic device 100 performs security authentication on the first instruction.

In some embodiments, the electronic device 100 presets a mapping relationship between the user operation and a security level. When the first instruction received by the electronic device 100 is a user operation, the electronic device 100 determines the security level of the user operation based on the preset mapping relationship.

In some embodiments, when the first instruction received by the electronic device 100 is a voice signal, the electronic device 100 performs voiceprint recognition on the first instruction. The electronic device 100 pre-stores a voiceprint model of an owner. The electronic device 100 extracts a feature of the voice signal of the first instruction. The electronic device 100 performs similarity calculation on the feature of the voice signal and the voiceprint model of the owner to obtain a matching degree score. If the matching degree score does not reach the first threshold, the electronic device 100 determines that a security level of the first instruction does not reach a preset level, that is, the authentication does not pass, or the authentication fails. If the matching degree score reaches the first threshold, the electronic device 100 determines that the security level of the first instruction reaches the preset level, that is, the authentication passes, or the authentication succeeds.

In some embodiments, before performing security authentication on the first instruction, the electronic device 100 needs to determine the preset level based on the first instruction. The electronic device 100 determines, based on the received first instruction, that the operation instruction corresponding to the first instruction is opening the target application. The electronic device 100 determines a risk level of opening the target application, and determines a preset level based on the risk level. For example, if a risk level of opening a browser is low, and a risk level of opening communication software is high, a preset level of opening the communication software determined by the electronic device 100 is higher than a preset level of opening the browser.

When the electronic device 100 determines that the security level of the first instruction does not reach the preset level, the electronic device 100 fails to authenticate the first instruction, and the electronic device 100 performs step S103: The electronic device 100 runs the target application. In this case, the target application cannot access first data. When the electronic device 100 determines that the security level of the first instruction reaches the preset level, the electronic device 100 successfully authenticates the first instruction, and the electronic device 100 performs step S107: The electronic device 100 runs the target application. In this case, the target application can access the first data.

In some embodiments, step S102 is optional. The electronic device 100 receives the first instruction, and the first instruction is a user operation. In this case, the electronic device 100 may directly perform step S103. For example, as shown in FIG. 3*a* and FIG. 3*b*, the electronic device 100 receives a left sliding operation (the first instruction) on the lock screen, and the electronic device 100 directly starts the camera application (the target application) in response to the left sliding operation without performing authentication.

Step S103: The electronic device 100 runs the target application, where the target application cannot access the first data.

The first data is user data accessible to the target application started by the electronic device 100 in the unlock state. Because the electronic device 100 fails to authenticate the first instruction or does not authenticate the first instruction, the target application currently run by the electronic device 100 cannot access the first data.

In some embodiments, the first data is data protected by a permission. When the electronic device 100 fails to authenticate the first instruction or does not authenticate the first instruction, the target application currently run by the electronic device 100 does not have a permission to access the first data.

In some embodiments, the electronic device 100 runs the target application in the second running environment. The second running environment is an independent running space of the electronic device 100, and the running space includes an initialized application program of the target application. When the electronic device 100 fails to authenticate the first instruction, the electronic device 100 runs the target application in the second running environment. The target application herein may be an initialized application program that does not have the user data (the first data) in the first running environment.

Optionally, the electronic device 100 may grant, by default, all permissions of the target application in the second running environment based on a policy configuration. The electronic device 100 can normally use the target application in the second running environment, but the user data (the first data) cannot be tracked, in other words, the second running environment and the user running environment (the first running environment) are independent of each other.

Optionally, the second running environment is a temporary running space. When the electronic device 100 determines that the security level of the first instruction does not reach the preset level, the electronic device 100 copies an initialized application program package of the target application in the second running environment, and starts the target application in the second running environment.

In some embodiments, the second running environment may alternatively be a second operating system in a virtual machine. When the electronic device 100 determines that the security level of the first instruction does not reach the preset level, the electronic device 100 starts the virtual machine, and runs the target application in the virtual machine.

Step S104: The electronic device 100 receives authentication information.

The electronic device 100 runs the target application in the second running environment, and the electronic device 100 continuously authenticates the user.

The electronic device 100 receives the authentication information. The authentication information may be a user operation such as tapping, sliding, a gesture, or a floating gesture, or may be a voice signal, an image signal, or the like. The authentication information may alternatively be facial data collected by the electronic device 100, an obtained password entered by the user, a collected fingerprint of the user, or the like.

In some embodiments, the electronic device 100 receives the authentication information sent by another device. For example, the another device receives a voice signal of a user, and performs voice recognition ASR and semantic understanding NLP on the voice signal. The another device sends an operation instruction to the electronic device 100 based on an operation instruction corresponding to the understood voice signal, and invokes the electronic device 100 to execute the operation instruction corresponding to the voice signal.

Step S105: The electronic device 100 performs security authentication on the authentication information, and determines whether the authentication succeeds.

The electronic device 100 performs security authentication on the received authentication information, and determines whether the authentication on the security level of the authentication information succeeds. A technical manner for performing security authentication may be face recognition, fingerprint recognition, password recognition, voiceprint recognition, user operation recognition, or the like.

In some embodiments, when the authentication information received by the electronic device 100 is a voice signal, the electronic device 100 performs voiceprint recognition on the authentication information. The electronic device 100 extracts a feature of the voice signal of the authentication information. The electronic device 100 performs similarity calculation on the feature of the voice signal and the voiceprint model of the owner to obtain a matching degree score. If the matching degree score does not reach a second threshold, the electronic device 100 determines that the security level of the authentication information does not reach a preset level, that is, the authentication fails. If the matching degree score reaches the second threshold, the electronic device 100 determines that the security level of the authentication information reaches the preset level, that is, the authentication succeeds.

Optionally, the electronic device 100 may accumulate voiceprint matching degrees of a plurality of voice signals in a calculation manner. If an accumulated voiceprint matching degree of the authentication information and the first instruction reaches the second threshold, the electronic device 100 determines that the security level of the authentication information reaches the preset level. Optionally, after receiving the authentication information, the electronic device 100 splices the voice signal of the first instruction and the voice signal the authentication information into a long voice instruction for voiceprint authentication in a voice instruction splicing manner, thereby improving authentication precision. If a voiceprint matching degree of the long voice instruction reaches the second threshold, the electronic device 100 determines that the security level of the authentication information reaches the preset level.

When the electronic device 100 determines that the security level of the authentication information reaches the preset level, the authentication information is successfully authenticated, and the electronic device 100 performs step S107: The electronic device 100 runs the target application. In this case, the target application can access the first data.

When the authentication information received by the electronic device 100 is successfully authenticated, the electronic device 100 may access the first data through the target application.

In some embodiments, the first data is data protected by a permission. When the electronic device 100 successfully authenticates the authentication information, the target application currently run by the electronic device 100 has a permission to access the first data. Optionally, when the authentication information received by the electronic device 100 is successfully authenticated, the electronic device 100 receives a user operation for the target application, and the target application accesses the first data.

In some embodiments, before the authentication information received by the electronic device 100 is successfully authenticated, the electronic device 100 generates user data (which may also be referred to as second data) in a process of running the target application. After the electronic device 100 determines that the authentication information is successfully authenticated, the electronic device 100 runs the target application. In this case, the target application can access the first data. In addition, the electronic device 100 merges the second data into the first data, so that running processes of the target application before and after the authentication succeeds are seamlessly connected, thereby improving user experience.

Figure 2F:
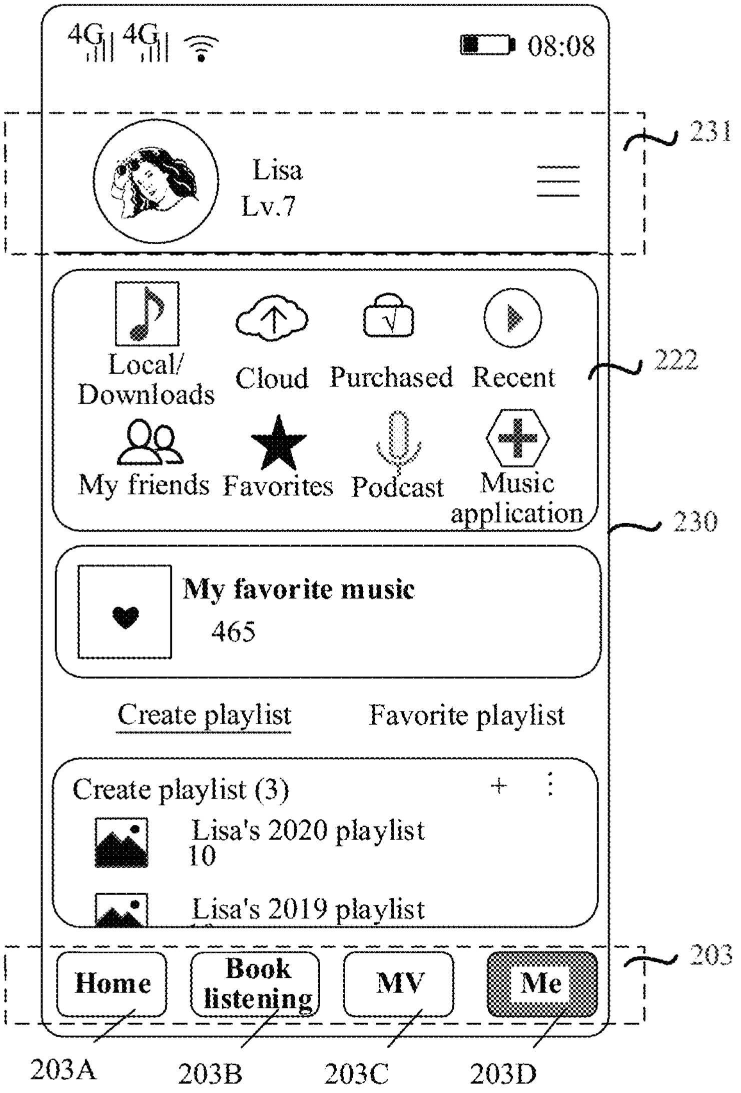

In some embodiments, when the authentication information is successfully authenticated, the electronic device 100 switches from the second running environment to the first running environment to run the target application. The first running environment and the second running environment do not interfere with each other and are independent of each other. In some embodiments, the first running environment may be understood as a user running environment when the electronic device 100 is in the unlock state. The first running environment includes user data of the owner of the electronic device 100. The electronic device 100 starts the target application in the first running environment. The target application herein has user data. For example, as shown in FIG. 2*d* and FIG. 2*f*, the electronic device 100 in FIG. 2*d* runs the music player application in the second running environment, and the music player application in the second running environment is in a non-login state and does not include user data (there is no song in "my favorite music"). However, the electronic device 100 in FIG. 2*f* runs the music player application in the first running environment, and the music player application in the second running environment is in a login state (the user is Lisa) and includes user data (there are 465 songs in "my favorite music").

Figure 4C:
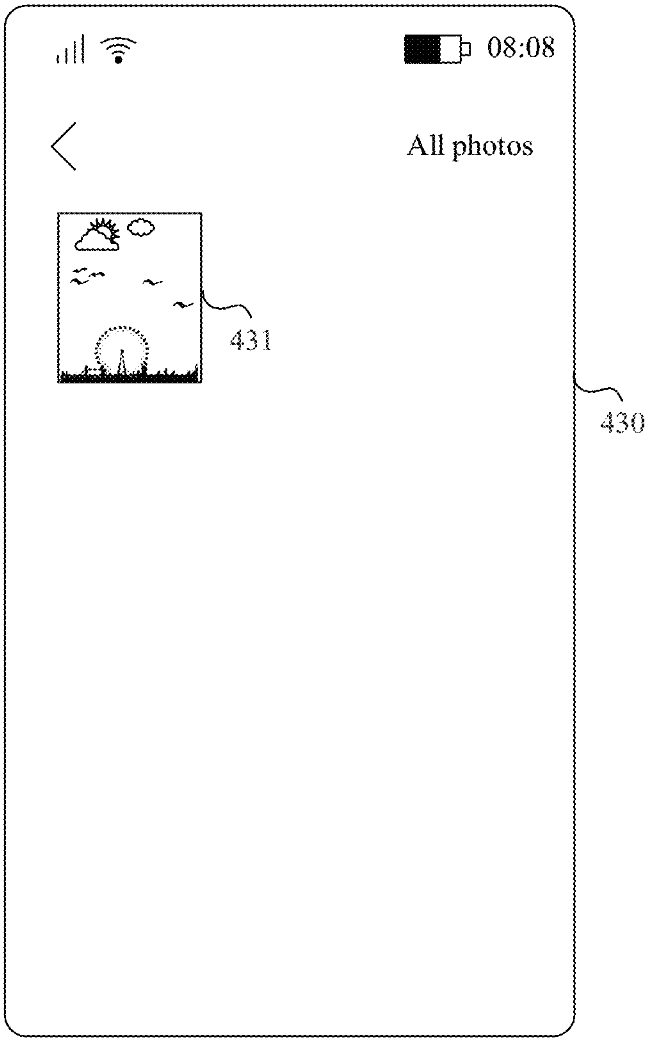
Figure 4D:
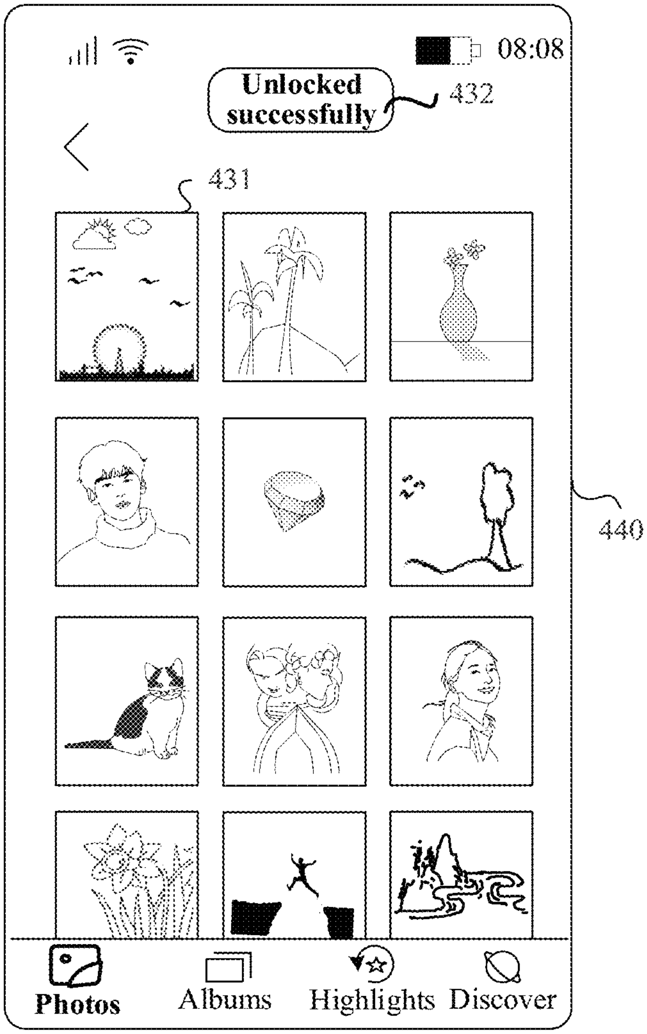

In some embodiments, the electronic device 100 switches from the second running environment to the first running environment to start the target application, and the electronic device 100 transfers user data generated by the target application in the second running environment to the first running environment. For example, as shown in FIG. 4*c* and FIG. 4*d*, the electronic device 100 in FIG. 4*c* obtains an image 431 in the second running environment by using the camera application. When the electronic device 100 switches from the second running environment to the first running environment, the electronic device 100 transfers user data (the image 431) generated by the camera application in the second running environment to the first running environment. In this case, the camera application in FIG. 4*d* displays, in the first running environment, the image 431 and a plurality of images stored in the first running environment.

When the electronic device 100 determines that the security level of the authentication information does not reach the preset level, the electronic device 100 continues to run the target application, and the target application cannot access the first data.

Optionally, the electronic device 100 performs step S106: The electronic device 100 continuously performs security authentication on received information or instructions until the authentication succeeds. When the authentication succeeds, the electronic device 100 performs step S107.

In some embodiments, when the electronic device 100 exits the second running environment, the electronic device 100 deletes the user data in the second running environment.

In this embodiment of this application, the electronic device 100 is in the lock screen state. When the electronic device 100 receives the first instruction to instruct to open the target application, and the electronic device 100 detects that the security level of the first instruction does not reach the preset level, the electronic device 100 starts the target application in the second running environment. The electronic device 100 continuously authenticates an input instruction. When the security level, detected by the electronic device 100, of the received authentication information reaches the preset level, the electronic device 100 switches from the second running environment to the first running environment to start the target application. An initialized application program is copied in the second running environment, and the target application run in the second running environment does not have user data. The first running environment is a running space of an application program after the electronic device 100 is unlocked, and the target application run in the first running environment has user data. In this way, the electronic device 100 provides different running environments based on different security levels by continuously detecting an instruction input by the user, thereby improving security of accessing an application program.

In addition, when the security authentication does not reach the preset level, the target application can still be used. In this embodiment of this application, a voiceprint authentication manner is used to resolve a problem that when the electronic device 100 is in a lock screen state, an application program can be accessed only when the electronic device 100 is unlocked first. In this embodiment of this application, when the target application is run in the second running environment, the target application can be switched, without being perceived by the user, from the second running environment to the first running environment for use in a manner of achieving a higher security level (the preset level) through continuous authentication, thereby improving user experience.

In some application scenarios, the electronic device 100 is in the unlock state, but the electronic device 100 is relatively far away from the user. When the electronic device 100 receives a voice instruction to instruct to open the target application, the electronic device 100 determines a distance between the sound source (the user) and the electronic device 100 based on the received voice instruction. When the distance between the sound source (the user) and the electronic device 100 is greater than the first threshold, the electronic device 100 performs voiceprint recognition on the voice instruction, and detects that a security level of the voice instruction does not reach the preset level. In this case, the electronic device 100 starts the target application in the second running environment, and continuously authenticates an input instruction. When the security level, detected by the electronic device 100, of the received authentication information reaches the preset level, the electronic device 100 switches from the second running environment to the first running environment to start the target application. Herein, when the user is relatively far away from the electronic device 100, the electronic device 100 runs the target application in the second running environment to protect user privacy security. In this case, the target application cannot access the first data, thereby improving security of accessing an application program.

In some application scenarios, the second running environment may be used as a demonstration program of the target application, to help the user learn of how to operate the target application and conveniently experience various functions of the target application. For example, the electronic device 100 may provide an entry control of the second running environment for the target application, and the second running environment includes an initialized target application. When the electronic device 100 detects a user operation for the entry control, the electronic device 100 starts the target application in the second running environment in response to the user operation. Because the target application in the second running environment is an initialized application program, the user can conveniently experience various functions of the target application.

A hierarchical architecture, an event-driven architecture, a micro-core architecture, a micro-service architecture, or a cloud architecture may be used for a software system of the electronic device 100. In this embodiment of this application, the software structure of the electronic device 100 is illustrated by using an Android system as an example. The Android system is merely a system example of the electronic device 100 in this embodiment of this application. This application may further be applicable to another type of operating system, such as iOS, Windows, and HarmonyOS. This is not limited in this application. The following uses only the Android system as an example of the operating system of the electronic device 100.

Figure 6:
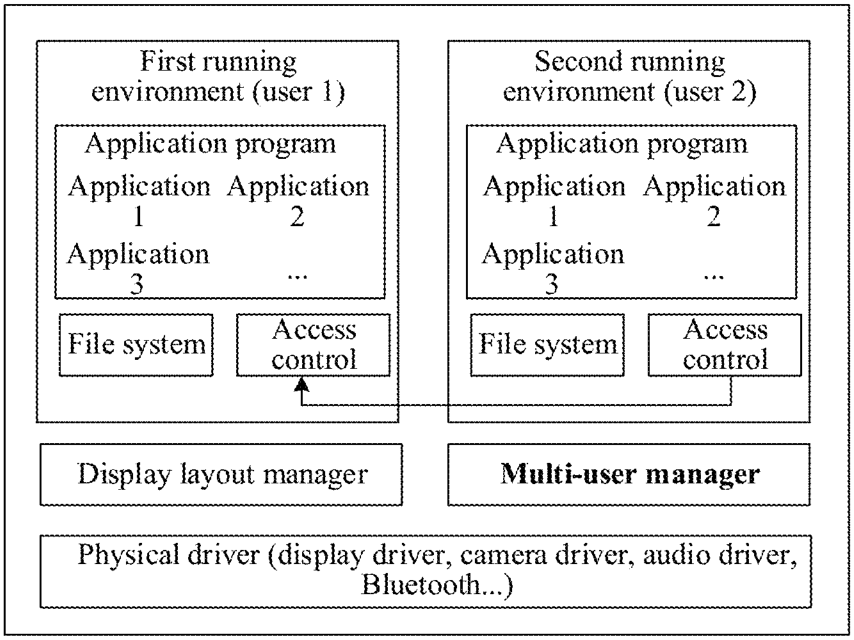
FIG. 6 is a schematic diagram of a software structure of an electronic device according to an embodiment of this application.

FIG. 6 is a block diagram of a software structure of an electronic device 100 constructed based on a multi-user second running environment.

As shown in FIG. 6, FIG. 6 includes a first running environment, the second running environment, a display layout manager, a multi-user manager, and a physical driver.

The first running environment includes one or more application programs, a file system, and an access control module. The one or more application programs include, for example, application programs such as a camera, a gallery, a calendar, and a call, and may further include system application programs such as a home screen, a leftmost screen, a control center, and a notification center.

The file system in the first running environment may be configured to store and obtain data, and enable the data to be accessible to an application program in the first running environment. The data may include a video, an image, audio, calls that are made and answered, a browsing history, a bookmark, a phonebook, and the like.

The access control module in the first running environment is configured to control the electronic device 100 to run an application program in the first running environment.

The first running environment and the second running environment are independent of each other and do not interfere with each other. Similar to the first running environment, the second running environment includes one or more application programs, a file system, and an access control module. The file system in the second running environment may be configured to store and obtain data, and enable the data to be accessible to an application program in the second running environment. The access control module in the second running environment is configured to control the electronic device 100 to run an application program in the second running environment.

In this embodiment of this application, the first running environment and the second running environment have different permissions. When the electronic device 100 detects that authentication on a first instruction fails, an application program is run in the second running environment. When authentication performed by the electronic device 100 succeeds, the application program is run in the first running environment.

The display layout manager may be configured to construct a display interface of an application program. The display layout manager includes a visual control such as a text display control or a picture display control. The display interface may include one or more views. For example, a display interface including an SMS message notification icon may include a text display view and a picture display view. In this embodiment of this application, the display layout manager may transmit display content to a display screen.

The multi-user manager is configured to manage a running environment that is running in a system, including information about a process, an application program, a service, and a task, and the like in the running environment. In this embodiment of this application, the electronic device 100 is in the lock screen state. When the electronic device 100 detects that the security level of the first instruction does not reach the preset level, the electronic device 100 runs the application program in the second running environment. When the electronic device 100 detects that the security level of the second instruction reaches the preset level, the electronic device 100 switches from the second running environment to the first running environment, and runs the application program in the first running environment.

The physical driver includes one or more of the following: a display driver, a camera driver, an audio driver, a sensor driver, a touch chip driver, an input system, and the like.

In this embodiment of this application, the first running environment and the second running environment (a user 1 and a user 2) run in a same operating system by using the multi-user manager, and share a display layout. In addition, in this embodiment of this application, user data in the second running environment may be transmitted to the second running environment by using the access control module, so that the electronic device 100 can seamlessly switch from the second running environment to the first running environment.

It can be understood that the software structure shown in FIG. 6 does not constitute a specific limitation on the electronic device 100. In some other embodiments, the electronic device 100 may include more or fewer components than those shown in the figure, some components may be combined, some components may be split, or a different component arrangement may be used. The components shown in the figure may be implemented by hardware, software, or a combination of software and hardware.

Figure 7:
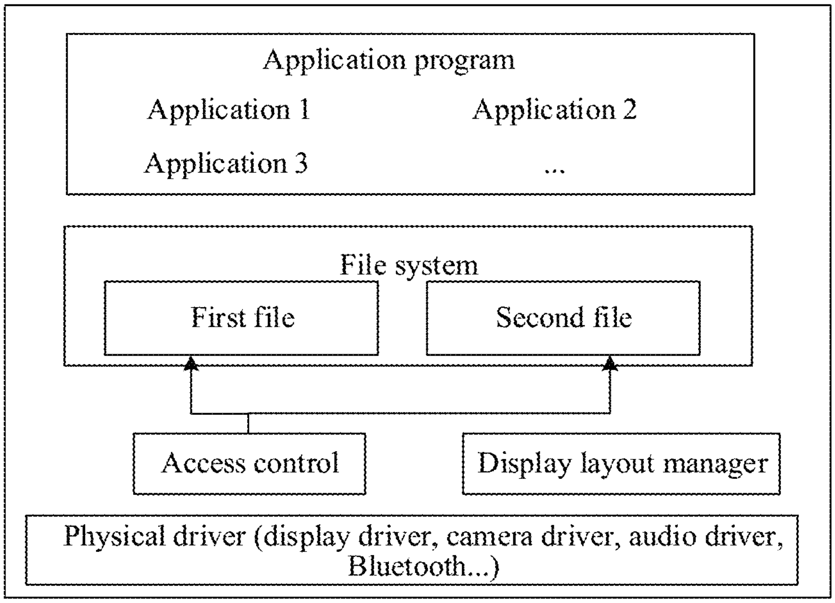
FIG. 7 is a schematic diagram of a software structure of another electronic device according to an embodiment of this application.

In some embodiments, FIG. 7 is a block diagram of a software structure of an electronic device 100 constructed based on a single-user second running environment.

As shown in FIG. 7, FIG. 7 includes one or more application programs, a file system, an access control module, a display layout manager, and a physical driver.

The one or more application programs include, for example, application programs such as a camera, a gallery, a calendar, and a call, and may further include system application programs such as a home screen, a leftmost screen, a control center, and a notification center.

The file system is configured to store and obtain data and enable the data to be accessible to an application program. The data may include a video, an image, audio, calls that are made and answered, a browsing history, a bookmark, a phonebook, and the like. The file system in FIG. 7 includes a first file and a second file. The first file may include one piece of user data of an application program, and the second file may include another piece of application data of the application program. The data in the first file does not interfere with the data in the second file.

In some embodiments, a permission of the first file is higher than that of the second file. In this embodiment of this application, when the electronic device 100 detects that authentication on a first instruction fails, an application program can access the second file, but cannot access the first file; or when authentication performed by the electronic device 100 succeeds, an application program can access the first file.

The access control module is configured to control the electronic device 100 to read data from the first file and run an application program, or to read data from the second file and run an application program. In this embodiment of this application, the electronic device 100 is in a lock screen state. When the electronic device 100 detects that a security level of the first instruction does not reach a preset level, the electronic device 100 reads data from the second file and runs the application program. The electronic device 100 continuously performs authentication. Subsequently, when the electronic device 100 detects that a security level of received authentication information reaches the preset level, the electronic device 100 switches from the second running environment to a first running environment, reads data from the first file, and runs the application program.

The display layout manager may be configured to construct a display interface of an application program. The display layout manager includes a visual control such as a text display control or a picture display control. The display interface may include one or more views. For example, a display interface including an SMS message notification icon may include a text display view and a picture display view. In this embodiment of this application, the display layout manager may transmit display content to a display screen.

The physical driver includes one or more of the following: a display driver, a camera driver, an audio driver, a sensor driver, a touch chip driver, an input system, and the like.

In this embodiment of this application, the first file and the second file run in a same operating system, and share a display layout. The first file and the second file have different access permissions, and the electronic device 100 accesses the first file and the second file based on a reached security level. In addition, in this embodiment of this application, user data in the second file may be transmitted to the first file by using the access control module, so that the electronic device 100 can seamlessly switch from a low-permission running environment to a high-permission running environment.

It can be understood that the software structure shown in FIG. 7 does not constitute a specific limitation on the electronic device 100. In some other embodiments, the electronic device 100 may include more or fewer components than those shown in the figure, some components may be combined, some components may be split, or a different component arrangement may be used. The components shown in the figure may be implemented by hardware, software, or a combination of software and hardware.

Figure 8:
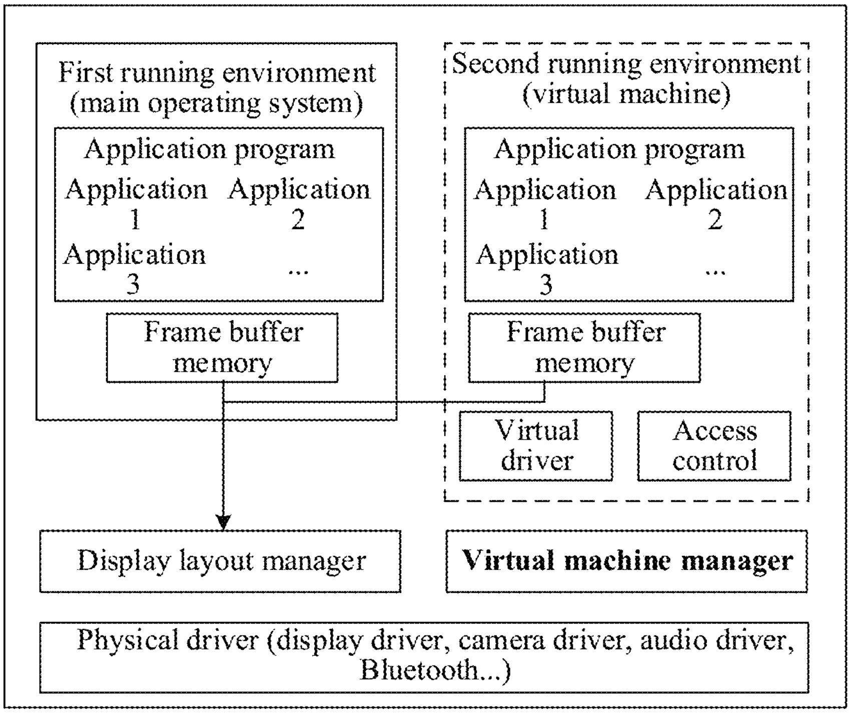
FIG. 8 is a schematic diagram of a software structure of another electronic device according to an embodiment of this application.

In some embodiments, FIG. 8 is a block diagram of a software structure of an electronic device 100 constructed based on a second running environment of a virtual machine.

As shown in FIG. 8, FIG. 8 includes a first running environment, a second running environment, a display layout manager, a multi-user manager, and a physical driver.

The first running environment includes one or more application programs and a frame buffer memory. The one or more application programs include, for example, application programs such as a camera, a gallery, a calendar, and a call, and may further include system application programs such as a home screen, a leftmost screen, a control center, and a notification center.

The frame buffer memory, which is referred to as a frame buffer or a video RAM for short, is used to store rendering data. An image rendered by a video card is stored in a default frame buffer. The frame buffer may allow an upper-layer application program to directly perform, in a graphics mode, a read/write operation on a display interface constructed by the display layout manager. The display layout manager can refresh the screen by accessing the frame buffer.

The display layout manager may be configured to construct a display interface of an application program. The display layout manager includes a visual control such as a text display control or a picture display control. The display interface may include one or more views. For example, a display interface including an SMS message notification icon may include a text display view and a picture display view. In this embodiment of this application, the display layout manager may transmit display content to a display screen.

The second running environment is a virtual machine. The virtual machine includes an independent operating system, including one or more application programs, a virtual driver, a frame buffer, an access control module, and the like.

The virtual driver includes a virtual display driver, a virtual camera driver, a virtual audio driver, a virtual Bluetooth driver, a virtual sensor driver, a virtual driver of a touch chip, an input system, and the like.

The frame buffer memory may be configured to store and obtain data. In this embodiment of this application, the electronic device 100 may transmit user data in the second running environment to the second running environment by using the frame buffer memory, so that the electronic device 100 can seamlessly switch from the first running environment to the second running environment.

The access control module is configured to control the electronic device 100 to run the application program in the second running environment.

The virtual machine manager is configured to manage a running environment that is running in a virtual machine, including information about a process, an application program, a service, a task, and the like in the running environment. In this embodiment of this application, when the electronic device 100 detects that the security level of the first instruction does not reach the preset level, the electronic device 100 runs the application program in the second running environment. When the electronic device 100 detects that a security level of subsequently received authentication information reaches the preset level, the electronic device 100 switches from the second running environment to the first running environment, and runs the application program in the first running environment.

The physical driver includes one or more of the following: a display driver, a camera driver, an audio driver, a Bluetooth driver, a sensor driver, a touch chip driver, an input system, and the like.

In this embodiment of this application, when the electronic device 100 detects that authentication on the first instruction fails, the electronic device 100 starts the virtual machine, and runs the application program in the second running environment. When the authentication performed by the electronic device 100 succeeds, the electronic device 100 exits the virtual machine, and runs the application program in the first running environment. In addition, in this embodiment of this application, user data in the second running environment may be transmitted to the second running environment by using the frame buffer memory, so that the electronic device 100 can seamlessly switch from the second running environment to the first running environment.

It can be understood that the software structure shown in FIG. 8 does not constitute a specific limitation on the electronic device 100. In some other embodiments, the electronic device 100 may include more or fewer components than those shown in the figure, some components may be combined, some components may be split, or a different component arrangement may be used. The components shown in the figure may be implemented by hardware, software, or a combination of software and hardware.

Some or all the foregoing embodiments may be implemented by software, hardware, firmware, or any combination thereof. When implemented by software, some or all the foregoing embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one network site, computer, server, or data center to another network site, computer, server, or data center in a wired (such as a coaxial cable, an optical fiber, or a digital subscriber line) or wireless (such as infrared, wireless, or microwave) manner. The computer-readable storage medium may be any usable medium accessible by a computer, or a data storage device such as a server or a data center in which one or more usable media are integrated. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing related hardware. The program may be stored in a computer-readable storage medium. When the program runs, the processes in the foregoing method embodiments are included. The foregoing storage medium includes any medium that can store program code, for example, a ROM, a random access memory RAM, a magnetic disk, or an optical disc.

What is claimed is:

1. An access control method, comprising:

receiving, by an electronic device, a first instruction, wherein the first instruction is used to open a target application;

failing, by the electronic device, to authenticate the first instruction, or skipping, by the electronic device, authenticating the first instruction;

running, by the electronic device, the target application in a second running environment in response to the first instruction, wherein the electronic device cannot access first data through the target application when running in the second running environment, the first data is accessible to the target application after the electronic device successfully authenticates the first instruction, and the second running environment is at least one of:

an independent running space isolated from a first running environment, wherein the first running environment and the second running environment each include a separate file system, a running space in which the target application reads data from a second file having a lower access permission than a first file, wherein first data is stored in the first file, the target application is restricted from accessing the first file, and the second file does not include the first data, or a virtual machine that does not include the first data;

receiving, by the electronic device, a user operation for the target application;

generating, by the electronic device, second data of the target application based on the user operation;

receiving, by the electronic device, authentication information;

in response to the authentication information being successfully authenticated, switching, by the electronic device, from the second running environment to the first running environment that can access the first data; and accessing, by the electronic device, the first data through the target application in response to the authentication information being successfully authenticated, accessing comprising deleting, by the electronic device, the second data in response to the authentication information being successfully authenticated.

2. The method according to claim 1, wherein:

before the receiving, by the electronic device, the first instruction, the electronic device is in a lock screen state; and receiving, by the electronic device, the first instruction comprises receiving, by the electronic device, the first instruction in the lock screen state.

3. The method according to claim 1, wherein accessing, by the electronic device, the first data through the target application in response to the authentication information being successfully authenticated comprises:

running, by the electronic device, the target application in the first running environment in response to the authentication information being successfully authenticated, wherein the target application running in the first running environment can access the first data.

4. The method according to claim 1, further comprising:

combining, by the electronic device, the second data with the first data in response to the authentication information being successfully authenticated.

5. The method according to claim 1, wherein the first instruction is received by the electronic device from another device different from the electronic device.

6. The method according to claim 1, wherein the first instruction is a voice instruction.

7. The method according to claim 6, wherein failing, by the electronic device, to authenticate the first instruction comprises:

extracting, by the electronic device, a voiceprint feature of the first instruction using a voiceprint recognition technology;

performing, by the electronic device, a similarity calculation on the voiceprint feature of the first instruction and a voiceprint model of an owner; and in response to the electronic device detecting that a similarity of the first instruction does not reach a first threshold, failing, by the electronic device, to authenticate the first instruction.

8. The method according to claim 6, wherein the authentication information comprises voice data, fingerprint data, facial data, password data, or a user operation instruction.

9. An electronic device, comprising:

one or more processors; and one or more memories respectively coupled to the one or more processors with computer instructions stored thereon, wherein, when the computer instructions are run on the one or more processors, the electronic device is enabled to perform:

receiving, by the electronic device, a first instruction, wherein the first instruction is used to open a target application;

failing, by the electronic device, to authenticate the first instruction, or skipping, by the electronic device, authenticating the first instruction;

running, by the electronic device, the target application in a second running environment in response to the first instruction, wherein the electronic device cannot access first data through the target application when running in the second running environment, the first data is accessible to the target application after the electronic device successfully authenticates the first instruction, and the second running environment is at least one of:
an independent running space isolated from a first running environment, wherein the first running environment and the second running environment each include a separate file system,
a running space in which the target application reads data from a second file having a lower access permission than a first file, wherein first data is stored in the first file, the target application is restricted from accessing the first file, and the second file does not include the first data, or
a virtual machine that does not include the first data;
receiving, by the electronic device, authentication information;
in response to the authentication information being successfully authenticated, switching, by the electronic device, from the second running environment to the first running environment that can access the first data; and
accessing, by the electronic device, the first data through the target application in response to the authentication information being successfully authenticated, accessing comprising:
receiving, by the electronic device, a user operation for the target application,
generating, by the electronic device, second data of the target application based on the user operation, and
deleting, by the electronic device, the second data in response to the authentication information being successfully authenticated.

10. The electronic device according to claim 9, wherein:
before the receiving, by the electronic device, the first instruction, the electronic device is in a lock screen state; and
receiving, by the electronic device, the first instruction comprises receiving, by the electronic device, the first instruction in the lock screen state.

11. The electronic device according to claim 9, wherein the computer instructions, when run on the one or more processors, further enable the electronic device to perform:
combining, by the electronic device, the second data into the first data when the authentication information is successfully authenticated.

12. The electronic device according to claim 9, wherein the first instruction is a voice instruction.

13. The electronic device according to claim 12, wherein failing, by the electronic device, to authenticate the first instruction comprises:
extracting, by the electronic device, a voiceprint feature of the first instruction by using a voiceprint recognition technology;
performing, by the electronic device, a similarity calculation on the voiceprint feature of the first instruction and a voiceprint model of an owner; and
in response to the electronic device detecting that a similarity of the first instruction does not reach a first threshold, failing, by the electronic device, to authenticate the first instruction.

14. The electronic device according to claim 12, wherein the authentication information comprises voice data, fingerprint data, facial data, password data, or a user operation instruction.

15. A non-transitory computer readable medium with instructions stored thereon, wherein the instructions, when executed by at least one processor, enable the processor to perform the steps of:
receiving a first instruction, wherein the first instruction is used to open a target application;
failing to authenticate the first instruction, or skipping authenticating the first instruction;
running the target application in a second running environment in response to the first instruction, wherein the target application cannot access first data when running in the second running environment, and the first data is data accessible to the target application after the first instruction is successfully authenticated, and the second running environment is at least one of:
an independent running space isolated from a first running environment, wherein the first running environment and the second running environment each include a separate file system,
a running space in which the target application reads data from a second file having a lower access permission than a first file, wherein first data is stored in the first file, the target application is restricted from accessing the first file, and the second file does not include the first data, or
a virtual machine that does not include the first data;
receiving a user operation for the target application;
generating second data of the target application based on the user operation;
receiving authentication information;
in response to the authentication information being successfully authenticated, switching from the second running environment to the first running environment that can access the first data; and
accessing the first data through the target application in response to the authentication information being successfully authenticated, accessing comprising deleting the second data in response to the authentication information being successfully authenticated.

16. The non-transitory computer readable medium of claim 15, wherein the instructions, when executed by at least one processor, further enable the processor to perform the step of:
combining the second data with the first data in response to the authentication information being successfully authenticated.

17. The non-transitory computer readable medium of claim 15, wherein the first instruction is a voice instruction.

18. The non-transitory computer readable medium of claim 15, wherein the instructions, when executed by at least one processor, further enable the processor to perform the steps of:
extracting a voiceprint feature of the first instruction using a voiceprint recognition technology;
performing a similarity calculation on the voiceprint feature of the first instruction and a voiceprint model of an owner; and
in response to detecting that a similarity of the first instruction does not reach a first threshold, failing to authenticate the first instruction.

19. The non-transitory computer readable medium of claim 15, wherein the instructions, when executed by at least one processor, further enable the processor to perform the step of:
running the target application in the first running environment in response to the authentication information being successfully authenticated, wherein the target application running in the first running environment can access the first data.

* * * * *